(12) United States Patent
Predtechenskiy et al.

(10) Patent No.: US 12,482,825 B1
(45) Date of Patent: Nov. 25, 2025

(54) AQUEOUS CARBON NANOTUBE DISPERSION, PASTE, CATHODE AND ANODE

(71) Applicant: MCD Technologies S.a r.l., Leudelange (LU)

(72) Inventors: Mikhail Rudolfovich Predtechenskiy, Novosibirsk (RU); Aleksandr Aleksandrovich Khasin, Luxembourg (LU); Oleg Filippovich Bobrenok, Novosibirsk (RU); Andrei Gennadievich Kosolapov, Novosibirsk (RU)

(73) Assignee: MCD TECHNOLOGIES S.A. R.L, Leudelange (LU)

( * ) Notice: Subject to any disclaimer, the term of this patent is extended or adjusted under 35 U.S.C. 154(b) by 0 days.

(21) Appl. No.: 18/684,401

(22) PCT Filed: May 20, 2022

(86) PCT No.: PCT/RU2022/000169
§ 371 (c)(1),
(2) Date: Feb. 16, 2024

(87) PCT Pub. No.: WO2023/128801
PCT Pub. Date: Jul. 6, 2023

(30) Foreign Application Priority Data

Dec. 29, 2021 (RU) .......................... RU2021139483

(51) Int. Cl.
*H01M 4/62* (2006.01)
*C09D 5/24* (2006.01)
(Continued)

(52) U.S. Cl.
CPC .............. *H01M 4/625* (2013.01); *C09D 5/24* (2013.01); *C09D 7/61* (2018.01); *C09D 101/286* (2013.01);
(Continued)

(58) Field of Classification Search
CPC .... H01M 4/625; H01M 4/5825; H01M 4/622; C09D 5/24; C09D 7/61; C09D 101/286; (Continued)

(56) References Cited

U.S. PATENT DOCUMENTS

| | | | |
|---|---|---|---|
| 2018/0037459 A1* | 2/2018 | Swogger | A61K 47/52 |
| 2023/0242402 A1* | 8/2023 | Morita | H01M 4/625 |
| | | | 423/445 R |
| 2024/0055613 A1* | 2/2024 | Fukumoto | H01M 4/1393 |

FOREIGN PATENT DOCUMENTS

| | | |
|---|---|---|
| EP | 2081244 A1 | 7/2009 |
| RU | 2564029 C2 | 9/2015 |

(Continued)

OTHER PUBLICATIONS

Search Report in PCT/RU 2022/000169 dated Sept. 1, 2022.

*Primary Examiner* — Mark Kopec
*Assistant Examiner* — Jaison P Thomas
(74) *Attorney, Agent, or Firm* — Bardmesser Law Group

(57) ABSTRACT

A dispersion containing water, a gelling agent, and 0.3 to 2 wt. % of single-walled and/or double-walled carbon nanotubes with a weight ratio of the single-walled and/or double-walled carbon nanotubes to the gelling agent at least 0.05 and not more than 10, wherein the dispersion contains gel particles formed by agglomerates of gelling agent molecules physically bound into a weak gel network by single-walled and/or double-walled carbon nanotubes. Also disclosed a method for producing a dispersion, a method for producing cathode and anode slurries, cathode and anode slurries, and (Continued)

a cathode and an anode are provided. The problems of obtaining an aqueous dispersion of single-walled and/or double-walled carbon nanotubes with both high stability during storage and transportation and low viscosity under various processes of its application, and producing electrode slurries and then lithium-ion battery electrodes, are addressed.

17 Claims, 9 Drawing Sheets

(51) Int. Cl.
*C09D 7/61* (2018.01)
*C09D 101/28* (2006.01)
*C09D 133/02* (2006.01)
*C09D 139/06* (2006.01)
*H01M 4/58* (2010.01)
*C08K 3/04* (2006.01)

(52) U.S. Cl.
CPC ......... *C09D 133/02* (2013.01); *C09D 139/06* (2013.01); *H01M 4/5825* (2013.01); *H01M 4/622* (2013.01); *C08K 3/041* (2017.05); *C08K 2201/001* (2013.01); *C08K 2201/011* (2013.01)

(58) Field of Classification Search
CPC .... C09D 133/02; C09D 139/06; C08K 3/041; C08K 2201/001; C08K 2201/011
See application file for complete search history.

(56) References Cited

FOREIGN PATENT DOCUMENTS

| RU | 2749904 C1 | 6/2021 | |
|---|---|---|---|
| WO | 2006/112162 A1 | 10/2006 | |
| WO | 2021/220773 A1 | 11/2021 | |
| WO | WO-2021245404 A1 * | 12/2021 | ............. C09K 5/066 |
| WO | WO-2022009915 A1 * | 1/2022 | ............ C01B 32/174 |
| WO | WO-2022137977 A1 * | 6/2022 | .......... H01M 4/0404 |
| WO | WO-2023108868 A1 * | 6/2023 | ............. C02F 1/043 |

* cited by examiner

AQUEOUS CARBON NANOTUBE DISPERSION, PASTE, CATHODE AND ANODE

FIELD OF THE INVENTION

The invention relates to aqueous dispersions of single-walled and/or double-walled carbon nanotubes and agglomerates thereof, the dispersions having both high stability and moderate viscosity. The invention also relates to methods for their production. The invention also relates to the use of such dispersions to produce electrode slurries. The invention also relates to electrode slurries. The invention also relates to electrodes of lithium-ion batteries, and to methods for producing lithium-ion battery electrodes.

DESCRIPTION OF THE RELATED ART

Dispersions of single-walled and double-walled carbon nanotubes can be used to introduce carbon nanomaterials into various coatings and composite materials, including electrode slurries for the production of lithium-ion battery electrodes.

The use of single-walled and/or double-walled carbon nanotubes in cathodes and electrodes of lithium-ion batteries makes it possible to increase the capacity of electrodes and of batteries as a whole, reduce their internal resistance, increase the charge-discharge cycle life of lithium-ion battery electrodes, specifically silicon-containing anodes of lithium-ion batteries, as demonstrated, for example, by RU 2749904 C1.

Single-walled and double-walled carbon nanotubes tend to bundle and agglomerate to a more complex geometry. The agglomeration of carbon nanotubes into long and thick bundles is desirable in a number of implementations, including, for example, to ensure high electrical conductivity of the electrode, but causes higher rate of sedimentation of dispersed carbon nanotube agglomerates, i.e., lower stability of dispersions and/or electrode slurry. Lower stability of a dispersion reduces the storage time of the dispersion, restricts potential logistics and process capabilities, increases the risk of non-homogeneous subsequent mixture with electrode slurry material and, as a result, the risk of rejects in the lithium-ion battery production. These risks are associated with lower stability of the electrode slurry containing single-walled and/or double-walled carbon nanotubes and agglomerates thereof to an even greater extent.

Methods are known in the art to improve stability of dispersions by preventing the agglomeration of dispersed particles, such as carbon nanotubes, by using dispersing agents and surfactants. For single-walled carbon nanotubes, chlorosulfonic acid is known, for example, to completely shift the equilibrium of the agglomeration process towards individual nanotubes [A. N. G. Parra-Vasquez, N. Behabtu, M. J. Green, C. L. Pint, C. C. Young, J. Schmidt, E. Kesselman, A. Goyal, P. M. Ajayan, Y. Cohen, Y. Talmon, R. H. Hauge, M. Pasquali, *Spontaneous Dissolution of Ultralong Single- and Multiwalled Carbon Nanotubes*, ACS Nano 2010 4 (7), 3969-3978]. This approach, however, has a disadvantage in that long bundles of carbon nanotubes are reduced or eliminated in the dispersion, though their presence is advantageous in some implementations, as they reduce the electrical percolation threshold and increase the electrical conductivity of a coating or a composite material (e.g., a lithium-ion battery electrode) obtained with this kind of dispersion.

On the other hand, dispersions of single-walled or double-walled carbon nanotubes are characterized by high viscosity, which grows with increasing concentration of nanotubes and bundles, and their aspect ratio A. N. G. Parra-Vasquez, J. G. Duque, M. J. Green, M. Pasquali, *Assessment of length and bundle distribution of dilute single-walled carbon nanotubes by viscosity measurements*, AIChE J., 60 (2014) 1499-1508]. Further agglomeration of carbon nanotube bundles to agglomerates of a complex shape results in a very high viscosity of the dispersion, making further use of the dispersion, e.g., for coating or transferring through process lines in the production process, technologically difficult.

At the same time, high viscosity of the dispersion reduces mobility of carbon nanotubes and their bundles and the rate of sedimentation of agglomerates, thus improving the stability of the dispersion. Conversely, the mobility and sedimentation rate of agglomerates are higher in dispersions with low viscosity. Hence, the choice of carbon nanotube dispersions is about finding a middle ground between high stability and low viscosity of the dispersion.

Therefore, there is a technical problem of obtaining a dispersion in which high stability of the dispersion and opportunity of long-term storage without its stratification and changing properties are combined with low viscosity necessary for the use of the dispersion, including in the production of an electrode slurry for lithium-ion batteries. There is a similar technical problem with the electrode slurry containing single-walled and/or double-walled carbon nanotubes: it is necessary to provide high viscosity during storage before use (application to the current collector of the electrode), high viscosity after the application to the current collector without spreading to ensure good quality of the edge of the active material layer of the electrode and, at the same time, low viscosity of the electrode slurry under the processing conditions defined for its application to the current collector.

There are solutions to obtain high viscosity gels containing carbon nanotubes in a dispersed state. Patent publication WO 2006112162 A1 provides a gel containing dispersed carbon nanotubes, based on an ionic liquid, such as obtained by the neutralization reaction of benzoic acid or its derivatives and base. This gel-containing carbon nanotubes ensures unlimited long-term storage without agglomeration of nanotube and sedimentation of their agglomerates. However, the use of the ionic liquid as a dispersion fluid greatly restricts dispersion applications. In the vast majority of uses, including the production of electrode slurries, such a gel cannot be directly used, and a dispersion based on an aqueous and/or organic solvent, predominantly containing neutral molecules, should be obtained from it before use. The stability of this dispersion will no longer be ensured by the stability of the initial gel, and the stability of the electrode slurry will also not be ensured. Additionally, for many implementations, including production of electrode slurries and lithium-ion battery electrodes, initial components of the ionic liquid may be undesirable even after dilution and dispersion in a solvent.

Some known solutions provide a dispersion composition such that the viscosity of the dispersion and/or its complex modulus are in a narrow range, which is a middle ground between high viscosity necessary to preserve good quality of the carbon nanotube dispersion and low viscosity desired for good workability to pumping and converting this dispersion into the final product. For example, EP 3333946 claims a dispersion of carbon nanotube bundles in a dispersion medium, the dispersion also containing hydrogenated nitrile butadiene rubber with 1 to 15 wt. % units obtained by hydrogenation of conjugated diene, the dispersion further characterized by a complex elastic modulus from 20 to 500 Pa at 1 Hz. The inventors of the cited patent use the complex elastic modulus at 1 Hz as some general rheological feature of the liquid: the liquid viscosity is too low at low complex elastic modulus; and the liquid viscosity is too high if complex elastic modulus is high, and the process (electrode formation) is no longer workable. As described in the cited patent, the viscosity of the dispersion with the above complex elastic modulus is 2 to 20 Pa·s at a shear rate of 1/(6.3 s). EP 3333946 does not aim to ensure high stability of the dispersion; however, limiting the viscosity below 20 Pa·s is not enough for the dispersion to remain stable for a long time, which is a disadvantage that prevents an efficient production process, including good storage and transportation of the dispersion.

JP 6860740 suggests limiting the viscosity of the dispersion and/or its complex modulus $G^* = (G'^2 + G''^2)^{1/2}$ and simultaneously limiting the phase angle, i.e., the arctangent of the ratio between the loss modulus G" and the storage modulus G' measured by applying shear strain oscillating with a frequency of 1 Hz. This publication claims dispersions containing carbon nanotubes, carboxymethylcellulose or its salt, and water, wherein carboxymethylcellulose or its salt has a weighted average molecular weight of 10000 to 100000 and an esterification degree of 0.5 to 0.9, and the product (X×Y) of the complex elastic modulus X (Pa) and the phase angle Y (°) of the dispersion is greater than or equal to 100 and less than or equal to 1500. It means that the suspension of the invention shall meet condition (1), where G" is the loss modulus, and G' is the storage modulus measured by applying shear strain oscillating with a frequency of 1 Hz.

$$100 \text{ Pa}° \leq (G'^2 + G''^2)^{1/2} \cdot \text{arctg}(G''/G') \leq 1500 \text{ Pa}° \quad (1)$$

A simple mathematical analysis of condition (1) shows that it does not restrict the storage modulus G' which defines the elastic properties of the dispersion. The value limited by the invention is a monotonous function of the loss modulus G". Condition (1) limits the loss modulus, which determines the viscous properties of the dispersion, G"<26.18 Pa with high values of G' →∞, and it should be even less with limited values of the storage modulus. At the same time, condition (1) limits the phase angle, which should be less than 3 to 7.5 degrees to meet this condition at very moderate values of the complex elastic modulus of 200 to 500 Pa. Such values of the phase angle are typical in rigid gels. Thus, JP 6860740 provides rigid gels of low viscosity dispersions. The disadvantages of this solution are quite obvious: the destruction of such a gel produces large agglomerates of several tens of micrometers in size, which cannot be further destroyed due to low viscosity of the dispersion and, therefore, low shear stresses. Therefore, mixing the dispersion with the active component of the electrode slurry makes it difficult to produce a uniform slurry, and its rheological properties are not optimal, e.g., the slurry viscosity may be too low to ensure its stability. Another embodiment of the invention described in JP 6860740 provides a dispersion which, along with the above limitation, is characterized by a phase angle of more than 15 degrees, but a complex elastic modulus of less than 50 Pa, meaning a very low viscosity of the dispersion and, therefore, its low stability.

JP 6860740 is adopted as the prototype for this application.

Thus, there is a technical problem of obtaining an aqueous dispersion of single-walled and/or double-walled carbon nanotubes with both high stability during storage and transportation and low viscosity under various processes of its use, including the production of the electrode slurry and then the lithium-ion battery electrode. There is a similar technical problem with the electrode slurry containing single-walled and/or double-walled carbon nanotubes: it is necessary to provide high viscosity during storage before use (application to the current collector of the electrode), high viscosity after the application to the current collector without spreading to ensure good quality of the edge of the active material layer of the electrode and, at the same time, low viscosity of the electrode slurry under the processing conditions defined for its application to the current collector. As a result, there is a problem of producing a lithium-ion battery electrode of high quality demonstrated by high specific capacity and stable operation in successive charge-discharge cycles. Known solutions, including JP 6860740 adopted as the prototype, do not make it possible to resolve this technical problem.

SUMMARY OF THE INVENTION

To solve the technical problem, the dynamic viscosity of the dispersion at rest during storage should be high, more than 20 Pa·s at a shear rate equal to or less than $1/6.3 \text{ s}^{-1}$, which makes it possible to store and/or transport the dispersion for a long time without agglomeration and/or sedimentation of carbon nanotubes, and the dynamic viscosity of the dispersion in the process flow is significantly lower: less than 2 Pa·s at a shear rate equal to or greater than $18.6 \text{ s}^{-1}$, i.e., low enough for the processing, in which this dispersion is used, including the electrode slurry production process. Hereinafter, the term "viscosity" refers to the dynamic viscosity at a temperature of 25° C. The dispersion storage and application conditions may be characterized by a different temperature, which does not negate the benefits of the dispersion of the invention. Importantly, the values of typical shear rates during storage and transportation ($<1/6.3 \text{ s}^{-1}$) and shear rates during the processing ($>18.6 \text{ s}^{-1}$), given here and used below, are not absolute, and they are taken as conventions for a quantitative description of the dispersion viscosities. The shear rates may exceed $1/6.3 \text{ s}^{-1}$ for some transport conditions and may be below $18.6 \text{ s}^{-1}$ for some processing using the dispersion, which does not negate the benefits of the dispersion of the invention.

Studies made by the inventors of the present application have shown that it is possible to produce dispersions of single-walled and/or double-walled carbon nanotubes and agglomerates thereof, which are non-ideal pseudoplastic fluids and follow the Ostwald-de Waele power law known for some non-ideal liquids, see W. Ostwald, *Ueber die rechnerische Darstellung des Strukturgebietes der Viskosität*, Kolloid-Zeitschrift 47 (1929) 176-187:

$$\mu_{\text{eff}} = K \left( \frac{\partial u}{\partial y} \right)^{n-1} \quad (2)$$

This law suggests that their viscosity depends on the shear rate in the liquid flow, i.e., the less the viscosity, the greater the shear rate. Pseudoplastic fluids are characterized by n<1. The lower the flow behavior index n, the more pronounced the dependence of the pseudoplastic fluid viscosity on the shear rate. Further studies have shown that the flow behavior index can be reduced significantly by adding a gelling agent (gelator, gelation agent) to the dispersion of single-walled and/or double-walled carbon nanotubes in such a way that gel particles (domains) build up in the dispersion, gel particles being formed by the molecules of this gelling agent and bound between each other with single-walled and/or double-walled carbon nanotubes or agglomerates containing carbon nanotubes. This simultaneous introduction of the gelling agent and single-walled and/or double-walled carbon nanotubes produces a synergistic effect resulting in a lower flow behavior index n (i.e., a greater difference between the dispersion and the ideal Newtonian fluid), compared to the flow behavior indices for the corresponding (comparable in concentration) dispersions of carbon nanotubes in a solvent and the gelling agent in a solvent.

The synergistic effect is caused by the presence in the dispersion of gel particles formed by the agglomerates of gelling agent molecules and physically bound into a weak gel network (some publications call the weak gel as structured liquid) by single-walled and/or double-walled carbon nanotubes. The resultant network provides a very high dispersion viscosity at low shear loads; however, the intermolecular bonds between carbon nanotubes and gelling agent molecules are weak enough so that any higher shear load destroys them and leads to a lower viscosity. The resultant system can be characterized as a multicomponent (two-component) supramolecular gel (see review by E. R. Draper and D. J. Adams, *How should multicomponent supramolecular gels be characterised?* Chem. Soc. Rev., 2018, 47, 3395; doi: 10.1039/c7cs00804j) with one strong gelling agent and one weak gelling agent, the latter being single-walled or double-walled carbon nanotubes.

Having both single-walled and/or double-walled carbon nanotubes and a gelling agent in the suspension is not enough for the said synergistic effect. If mixing and dispersing nanotubes and a gelling agent in water make the gelling agent and nanotubes form only a gel network of co-assembling gels or, conversely, if the gelling agent and nanotubes form two independent interpenetrating gel networks, the resultant gel will not have the feature in question in both cases, and its properties will be close to the prototype described above. However, if mixing and dispersing of nanotubes and a gelling agent in water provide conditions in which gel particles (domains) of the gelling agent in the solvent build up, and single-walled and/or double-walled carbon nanotubes bind the gel domains containing only or mainly the gelling agent into a single network of a two-component gel, the resultant dispersion shows sharp viscosity as a function of shear rate, as discussed above with very low values of the flow behavior index.

Gel structure characterization: whether it consists of only joint agglomerates (co-assembling gels) or contains single-component gel domains of a gelling agent bound by carbon nanotubes (or agglomerates containing carbon nanotubes) (self-sorting gel) requires special and not standard research methods, such as cryogenic transmission electron microscopy and NMR microtomography. On the other hand, the gel structure can be defined by its rheological properties—viscosity as a function of shear rate, or complex modulus $G^*$ and its components $G'$ and $G''$ as a function of shear strain.

The present invention, in one embodiment, provides a dispersion that includes water, a gelling agent, and single-walled and/or double-walled carbon nanotubes, wherein the content of the single-walled and/or double-walled carbon nanotubes ranges from 0.3 to 2 wt. %, and the weight ratio of the single-walled and/or double-walled carbon nanotubes to the gelling agent is at least 0.05 and not more than 10, wherein the dispersion contains gel particles formed by agglomerates of gelling agent molecules physically bound into a weak gel network by single-walled and/or double-walled carbon nanotubes.

The present invention, in one embodiment, also provides a dispersion containing water, a gelling agent, and single-walled and/or double-walled carbon nanotubes, characterized in that the content of the single-walled and/or double-walled carbon nanotubes ranges from 0.3 to 2 wt. %, and the weight ratio of the single-walled and/or double-walled carbon nanotubes to the gelling agent is at least 0.05 and not more than 10, wherein the dispersion is a pseudoplastic fluid with a flow behavior index n not more than 0.37 and a flow consistency index K at least 3.2 Pa·$s^n$.

A dispersion with this composition, structure, or having such rheological properties gives the benefit of very high dynamic viscosity of the dispersion at low shear loads (e.g., less than 1/6.3 $s^{-1}$) and low dynamic viscosity at shear loads typical for processing (e.g., more than 18.6 $s^{-1}$) due to the synergistic effect on the viscosity of single-walled and/or double-walled carbon nanotubes and the gelling agent.

The gelling agent refers to a substance with its polymer chains capable of forming a net cross-linked by intermolecular forces (the van der Waals forces, hydrogen bonds or others). This ensures high viscosity of the dispersion at rest; however, high shear rates cause the viscosity of the dispersion with a gelling agent to decrease significantly. Polymers capable of intermolecular interactions can be a gelling agent. The examples of substances that can be used as a gelling agent are, but not limited to: carboxymethylcellulose and/or its salt, polyvinylpyrrolidone, polyvinylidene fluoride, hydrogenated nitrile butadiene rubber, polyacrylic acid and/or its salt, or a mixture thereof. Most preferably, a gelling agent is one of the following for aqueous dispersions of this invention: carboxymethylcellulose Na salt, carboxymethylcellulose Li salt, polyacrylic acid Na salt, or polyacrylic acid Li salt, or polyvinylpyrrolidone. In some cases, two or more different gelling agents are preferably present in the dispersion along with single-walled and/or double-walled carbon nanotubes.

A gelling agent in the dispersion ensures higher flow consistency index K and lower flow behavior index n. Single-walled and/or double-walled carbon nanotubes and/or agglomerates thereof in the dispersion also ensure higher flow consistency index K and lower flow behavior index n. Having both a gelling agent and single-walled and/or double-walled carbon nanotubes and/or agglomerates thereof in the dispersion so that the dispersion contains gel particles formed by agglomerates of gelling agent molecules physically bound into a weak gel network by single-walled and/or double-walled carbon nanotubes produces the synergistic effect resulting in a significantly lower flow behavior index n (i.e., a greater difference between the dispersion and the ideal Newtonian fluid) compared to the flow behavior indices for the corresponding dispersions of carbon nanotubes in a solvent and a gelling agent in a solvent. It also gives a higher loss modulus $G''$ and a higher phase angle d=arctan ($G''/G'$) under an oscillating shear load.

A preferable weight ratio of single-walled and/or double-walled carbon nanotubes to the gelling agent in the dispersion is at least 0.1 and not more than 5. The most preferable weight ratio of single-walled and/or double-walled carbon nanotubes to the gelling agent in the dispersion is at least 0.33 and not more than 3. However, the synergistic effect producing the technical result is also achievable with a weight ratio of single-walled and/or double-walled carbon nanotubes to a gelling agent in the dispersion in the range of 0.05 to 0.33. For some implementations, the most preferable weight ratio of single-walled and/or double-walled carbon nanotubes to the gelling agent in the dispersion is at least 0.5 and not more than 2. The synergistic effect producing the technical result is also achievable with a weight ratio of single-walled and/or double-walled carbon nanotubes to a gelling agent in the dispersion in the range of 2 to 10.

Having single-walled and/or double-walled (rather than multi-walled) carbon nanotubes in the dispersion is generally a prerequisite for the technical result. Single-walled carbon nanotubes are known to have a small diameter, which is less than 4 nm, e.g., 1.5 nm, for stable single-walled carbon nanotubes, and, at the same time, a great length that can exceed 5 μm. Thus, single-walled carbon nanotubes have a very large length-to-diameter ratio that can exceed 3000. Double-walled carbon nanotubes are also known to have an outer diameter that does not exceed 6 nm, e.g., it can be 2.8 nm, and their length can also exceed 5 μm. This high length-to-diameter ratio causes single-walled carbon nanotubes to have a significant effect on the dispersion rheology, which, together with the synergistic effect from the simultaneous presence of a gelling agent, provides the desired technical result. Agglomerating single-walled and/or double-walled carbon nanotubes can form agglomerates with a length-to-diameter ratio that is either somewhat smaller or larger than that of individual nanotubes contained therein. Single-walled and/or double-walled carbon nanotube agglomerates preferably contain bundles of single-walled and/or double-walled carbon nanotubes with a length-to-diameter ratio greater than 100, more preferably with the length-to-diameter ratio of single-walled and/or double-walled carbon nanotubes greater than 500, and most preferably with the length-to-diameter ratio of single-walled and/or double-walled carbon nanotubes greater than 1000.

The content of single-walled and/or double-walled carbon nanotubes in the dispersion which makes it possible to achieve the desired technical result is between 0.3 and 2 wt. %. The preferable content of single-walled and/or double-walled carbon nanotubes in the dispersion is determined by process equipment used and logistic features. Preferably, the content of single-walled and/or double-walled carbon nanotubes is from 0.3 to 1.4 wt. %. For some implementations, the content of single-walled and/or double-walled carbon nanotubes is preferably from 0.3 to 0.6 wt. %, most preferably from 0.35 to 0.45 wt. %. For some other implementations, the content of single-walled and/or double-walled carbon nanotubes in the dispersion is preferably from 0.6 to 1.2 wt. %, most preferably from 0.7 to 1 wt. %.

The ability of single-walled and/or double-walled carbon nanotubes to interact with each other via the van der Waals forces (π-π interaction) and agglomerate (bundle) is also very important for achieving the technical result. Defects of single-walled and/or double-walled carbon nanotubes reduce this ability. Therefore, single-walled and/or double-walled carbon nanotubes preferably contain as few defects as possible. A quantitative indicator showing the number of defects in the structure of single-walled and/or double-walled carbon nanotubes is the ratio of G and D line intensities in the Raman spectrum—the larger this ratio, the fewer carbon nanotube defects. A preferable G and D line intensity ratio in the 532 nm Raman spectrum is at least 10, a more preferable G and D line intensity ratio in the 532 nm Raman spectrum is at least 40, an even more preferable G and D line intensity ratio in the 532 nm Raman spectrum is at least 60, and the most preferable ratio is at least 80.

In addition to single-walled and/or double-walled carbon nanotubes, the dispersion may contain, but not limited to, impurities of other carbon allotropes, including amorphous carbon and/or graphite and/or multi-walled carbon nanotubes. The impact of these impurities on the dispersion rheology is insignificant and, therefore, the impurities do not affect the technical result.

The dispersion of single-walled and/or double-walled carbon nanotubes and/or agglomerates thereof may contain impurities of metals from Groups 8-11 of the Periodic Table of Elements or metal carbide used as a catalyst in the production of carbon nanotubes, e.g., iron or cobalt, or other metals, bimetallic particles, or their alloys, which are due to how these carbon nanotubes are obtained. For some implementations, including the production of the electrode slurry and further production of the electrode, the content of metal impurities of Groups 8-11 of the Periodic Table of Elements in single-walled and/or double-walled carbon nanotubes and/or agglomerates thereof is preferably less than 1 wt. %. For some implementations, the content of metal impurities of Groups 8-11 of the Periodic Table of Elements in single-walled and/or double-walled carbon nanotubes and/or agglomerates thereof is more preferably less than 0.1 wt. %. For other implementations, on the contrary, there is no reason to restrict the content of metal impurities of Groups 8-11 of the Periodic Table of Chemical Elements in single-walled and/or double-walled carbon nanotubes and/or agglomerates thereof so much, so it can be up to 15 wt. %.

For the best synergistic effect to achieve minimum flow behavior index n, the surface of single-walled and/or double-walled carbon nanotubes preferably contains functional groups, such as, but not limited to, oxygen-containing groups (most preferable, the surface contains carboxyl and/or carbonyl and/or hydroxyl groups) or chlorine-containing groups. In this case, the interaction between carbon nanotubes and gelling agent molecules is stronger, and the synergistic effect of the gelling agent and nanotubes on lowering flow behavior index is most pronounced. The functional groups can be produced on the surface of carbon nanotubes by various methods known in the art. For example, carboxyl functional groups can be produced on the surface of carbon nanotubes by heat treatment in a nitric acid solution, and chlorine-containing functional groups can be produced by one of the methods described in RU 2717516 C2, but not limited to the examples given. The functionalization methods, i.e., methods for producing functional groups on the surface of carbon nanotubes, are outside the scope of this disclosure, but may be found in the literature. The content of functional groups on the surface of single-walled and/or double-walled carbon nanotubes is preferably at least 0.1 wt. %; most preferably, the chlorine content on the surface of single-walled and/or double-walled carbon nanotubes is at least 0.1 wt. %. The technical result is also achievable with single-walled and/or double-walled carbon nanotubes with their surface functionalized by at least 0.1 wt. % of carbonyl and/or hydroxyl, and/or carboxyl groups. However, the technical result is also achievable with single-walled and/or double-walled carbon nanotubes not containing functional groups on the surface, e.g., deliberately heated in an inert atmosphere to remove potential functional groups on the surface.

The dispersions containing water, a gelling agent, and single-walled and/or double-walled carbon nanotubes are pseudoplastic and, due to the synergistic interaction of the single-walled and/or double-walled carbon nanotubes and the gelling agent in the dispersion, they demonstrate a very strong dependence of dispersion viscosity on the shear rate in the flow. This solves the technical problem, for the majority of implementations, to provide, on the one hand, high viscosity of dispersion at rest (during storage and/or transportation) and, on the other hand, the necessary viscosity under specific dispersion usage conditions-when the dispersion flows through a pipe or when it is sprayed through a nozzle, or in other applications with a given shear rate in the flow. To solve the problem, the flow behavior index n is preferably small enough, not more than 0.37, and the flow consistency index K is at least 3.2 Pa·s". More preferably, the flow behavior index n is not more than 0.30; and most preferably, the flow behavior index n is not more than 0.2.

The flow behavior index n and the flow consistency index K refer to the parameters of dispersion viscosity $m_{eff}$ as a function of shear rate Y, as described by the Ostwald-de Waele power equation (2). Importantly, the dispersion viscosity as a function of shear rate may not exactly follow the Ostwald-de Waele power law. If the dispersion viscosity as a function of shear rate differs from the power law, the flow behavior index n and the flow consistency index K are taken to be the parameters corresponding to the best linear approximation on the plot of viscosity logarithm as a function of shear rate logarithm, based on the least squares criterion, for example.

The flow behavior index n and the flow consistency index K preferably meet the following condition: n<1.25·lg (K/(Pa·s"))−0.628. In this case, the viscosity of the dispersion at rest during storage remains high, more than 20 Pa·s at a shear rate equal to or less than 1/6.3 $s^{-1}$, which allows a long-term storage and/or transportation of the dispersion without agglomeration and/or sedimentation of carbon nanotubes and agglomerates thereof.

The flow behavior index n and the flow consistency index K preferably meet the following condition: n<1.24−0.787·lg (K/(Pa·s")). In this case, the dispersion viscosity in the flow is below 2 Pa·s at a shear rate equal to or greater than 18.6 $s^{-1}$ and, therefore, low enough for the processing which uses this dispersion, including for the production of an electrode slurry.

The dispersion is preferably characterized by a loss modulus of at least 27 Pa when the oscillating shear strain at a frequency of 1 Hz and a relative shear strain amplitude of 1% is applied. The loss modulus G" can be measured using a rotary rheometer with a cone-and-plate cell or a plate-and-plate cell. With the plate-and-plate cell, it is important that the gap between the plates is at least 500 μm to measure the loss modulus correctly, since the length of single-walled carbon nanotube bundles can be several tens of μm. If a smaller gap is set, wall effects may become significant, and the measured values may be erroneous.

The present invention, in one embodiment, provides a method for producing a dispersion containing water, a gelling agent and 0.3 to 2 wt. % of single-walled and/or double-walled carbon nanotubes, wherein a weight ratio of single-walled and/or double-walled carbon nanotubes to the gelling agent is at least 0.05 and not more than 10, characterized in that the method comprises a sequence of at least three dispersion stages (D) and at least two resting stages (R) alternating, where any of the dispersion stages (D) is either a stage of mechanical processing of the dispersion at a shear rate of at least 10000 $s^{-1}$ with a specific input energy of at least 10 W·h/kg or an ultrasonic treatment stage at a frequency of at least 20 kHz with a specific input energy of at least 1 W·h/kg, and the resting stage (R) is exposing the dispersion between two successive dispersion stages (D) to a shear rate of less than 10 $s^{-1}$ for at least 1 minute.

The provided method for producing the dispersion allows, on the one hand, dispersing single-walled carbon nanotubes due to high shear rates at the stages (D), and, on the other hand, forming a segregated structure of a two-component gel containing gel domains with a gelling agent predominantly, bound into a single network by single-walled and/or double-walled carbon nanotubes or agglomerates containing single-walled and/or double-walled carbon nanotubes, at the resting stages (R). Note that this production method ensures better dispersion and distribution of single-walled and/or double-walled carbon nanotubes. Since the resultant dispersion is pseudoplastic, local low-viscosity zones in areas with high shear rate and local high-viscosity zones in areas with low shear rate may form during the mechanical processing or ultrasonic treatment and there is low intensity or almost no mass transfer between these zones. For this reason, the provided method suggests that the technical result is achievable by repeating the stages of mechanical processing or ultrasonic treatment more than twice, and the dispersion should be at rest or at relatively low shear rates of less than 10 $s^{-1}$ for at least 1 minute between periodically repeating stages of the mechanical processing or ultrasonic treatment.

The mechanical processing can be performed with a variety of dispersing or mixing equipment providing the desired shear rate in the dispersion flow, including, for example, rotor-stator dispersers and homogenizers (dissolvers), colloid mills, bead mills, planetary mills, high-pressure homogenizers (HPHs), and rotary pulsation apparatuses (RPAs). In some implementations, a disk dissolver, i.e., a vertical agitator with a disk impeller, preferably with a toothed disk impeller, is sufficient and preferable for mechanical activation. If a bead mill or high-pressure homogenizers with the dispersion stream passing through a very high shear rate zone is used, the dispersion stage (D) comprises pushing the entire volume of the dispersion through the mill or the homogenizer. In this case, the resting stage (R) implies the presence of a dispersible mixture comprising a solvent, HNBR and single-walled and/or double-walled carbon nanotubes between the dispersion cycles in a tank where it is just agitated slowly at a shear rate of less than 10 $s^{-1}$.

The choice of equipment for mechanical processing or ultrasonic treatment, specific power, duration of processing at each stage depends on the available equipment and the composition of the dispersion: the selected solvent, the concentration of carbon nanotubes, the concentration and brand of the selected HNBR, and availability of other fillers and additives. In this regard, some equipment options may not apply to some dispersion compositions.

In some cases, the method preferably comprises a sequence of at least five dispersion stages (D) and at least four resting stages (R) alternating, where any of the dispersion stages (D) is either a stage of mechanical processing of the dispersion at a shear rate of at least 10000 $s^{-1}$ with a specific input energy of at least 10 W·h/kg or an ultrasonic treatment stage at a frequency of at least 20 kHz with a specific input energy of at least 1 W·h/kg, and the resting stage (R) is exposing the dispersion between two successive dispersion stages (D) to a shear rate of less than 10 $s^{-1}$ for at least 1 minute. In other implementations, the method preferably comprises a sequence of at least 10 dispersion stages (D) and at least 9 alternating resting stages (R). In other implementations, the method preferably comprises a sequence of at least 30 dispersion stages (D) and at least 29 alternating resting stages (R).

In some implementations, a sequence of at least three (D) stages and at least two resting stages (R) alternating is implemented by circulating the dispersion between one or several devices providing the stages of mechanical processing or ultrasonic treatment, and a tank where the dispersion is held and agitated slowly at shear rates of less than 10 $s^{-1}$. Here, the factor of such dispersion circulation during the dispersion production is preferably at least 5. In some method implementations, the dispersion circulation factor during production can be at least 10. In other implementations, the dispersion circulation factor during the production is preferably at least 30. The preferred number of circulation cycles is defined by the composition of the dispersion, type of dispersing equipment, and specific input power at the dispersion stage.

In some implementations, the production method preferably comprises circulating the dispersion at a circulation rate of 100 to 10000 kg/h between a rotary pulsation apparatus at a shear rate of at least 10000 s$^{-1}$ with a specific input energy of at least 10 W·h/kg, an ultrasonic treatment device with an immersed sonotrode (ultrasound probe, ultrasonic actuator) with a frequency of at least 20 kHz and a specific input energy of at least 1 W·h/kg, and a tank where the residence time of dispersion in the tank at least 1 min and dispersion is agitated slowly at shear rates of less than 10 s$^{-1}$. The residence time refers to the ratio between the tank volume and the circulation rate, i.e., the mean residence time of the dispersion in the tank in the approximation of a perfect mixing device. In some implementations, the shear rate between the rotor and the stator of the rotary pulsation apparatus is preferably at least 20000 s$^{-1}$, most preferably at least 50000 s$^{-1}$. In some implementations, the specific input energy is preferably not more than 30 W·h/kg when the dispersion passes through the rotary pulsation apparatus; however, the technical result is also achievable with the specific input energy between 10 and 30 W·h/kg when the dispersion passes through the rotary pulsation apparatus. Also preferably, the ultrasonic treatment is at a frequency of at least 40 kHz and the specific input energy of more than 2 W·h/kg; however, the technical result is also achievable at a frequency of 20 to 40 kHz and the specific input energy of 1 to 2 W·h/kg, but this requires more cycles.

In some implementations, the production method preferably comprises circulating the dispersion at a circulation rate of 100 to 10000 kg/h between a high-pressure homogenizer at a shear rate of at least 10000 s$^{-1}$ and the specific input energy of at least 10 W·h/kg, and a tank where the dispersion average residence time is at least 1 min and it is agitated slowly at shear rates of less than 10 s$^{-1}$. The pressure upstream of the homogenizer valve can be more than 30 MPa, e.g., more than 60 MPa, and it is determined by the design of the homogenizer. The nozzle diameter is also determined by the homogenizer design, which is outside the scope of this invention, and can be less than 2 mm, e.g., 700 μm. In some implementations, the shear rate between the rotor and the stator of the rotary pulsation apparatus is preferably over 70000 s$^{-1}$, most preferably over 500000 s$^{-1}$. In some implementations, the specific input energy at each dispersion stage is preferably over 20 W h/kg, most preferably over 30 W·h/kg. However, the technical result is also achievable with the specific input energy at each dispersion stage between 10 to 20 W·h/kg of the dispersion, but this requires more cycles.

The present invention, in one embodiment, provides a method for producing a cathode slurry containing an active cathode material, water, a gelling agent, and at least 0.005 wt. % of single-walled and/or double-walled carbon nanotubes, characterized in that the method comprises the stages of (C1) mixing an active lithium-containing component and the above dispersion containing water, a gelling agent and single-walled and/or double-walled carbon nanotubes, wherein the content of single-walled and/or double-walled carbon nanotubes in the dispersion is 0.3 to 2 wt. % and the weight ratio between single-walled and/or double-walled carbon nanotubes and the gelling agent in the dispersion is at least 0.05 and not more than 10, and (C2) agitating the resultant mixture to produce a homogeneous slurry.

The present invention, in one embodiment, provides a cathode slurry containing an active cathode material, water, a gelling agent and single-walled and/or double-walled carbon nanotubes, characterized in that the cathode slurry contains at least 0.005 wt. % of single-walled and/or double-walled carbon nanotubes and it is produced by the above method.

The present invention, in one embodiment, provides a method for producing an anode slurry containing an active anode material, water, a gelling agent and at least 0.01 wt. % of single-walled and/or double-walled carbon nanotubes, characterized in that the method comprises the stages of (A1) mixing an active silicon-containing component and the above dispersion containing water, a gelling agent and single-walled and/or double-walled carbon nanotubes, wherein the content of single-walled and/or double-walled carbon nanotubes in the dispersion is 0.3 to 2 wt. % and the weight ratio between single-walled and/or double-walled carbon nanotubes and the gelling agent in the dispersion is at least 0.05 and not more than 10, and (A2) agitating the resultant mixture to produce a homogeneous slurry.

The present invention, in one embodiment, provides an anode slurry containing an active cathode material, water, a gelling agent and single-walled and/or double-walled carbon nanotubes, characterized in that the anode slurry contains at least 0.01 wt. % of single-walled and/or double-walled carbon nanotubes and it is produced by the above method. At stage (C2) or (A2), the agitating of the mixture obtained at stage (C1) or (A1), respectively, to produce a homogeneous suspension can be performed by any known mixing method and with any mixing equipment, e.g., vertical agitators (also known as dissolvers), planetary mixers, rotor-stator type mixers, twin screw mixers, but not limited to the examples given. In some implementations, the agitating is preferably performed using a disk dissolver, i.e., a vertical stirrer with a disk impeller, preferably with a toothed disk impeller. Planetary mixers are the most preferable at stage (C2) or (A2). Note that the choice of the mixing method for stage (C2) or (A2) and the choice of equipment for these stages are outside the scope of this invention.

An active cathode material refers to any material with the following properties (as reviewed by M. S. Whittingham, *Lithium Batteries and Cathode Materials*, Chem. Rev. 2004, Vol. 104, pp. 4271-4301): (1) The material contains a readily reducible/oxidizable ion, for example a transition metal cation. (2) The material reacts with lithium in a reversible manner with no fundamental change of its structure; (3) the material reacts with lithium with a high free energy (Helmholtz potential) of reaction; (4) the material interacts with lithium very rapidly. For example, the active material of the cathode slurry can be one of the following: $LiTiS_2$, $LiVSe_2$, $LiCoO_2$, $LiNiO_2$, $LiFePO_4$ (also referred to as LFP), $LiNi_xMn_yCo_zO_2$ (where x, y, z are positive numbers less than 1, such that x+y+z=1, also referred to as NMC, e.g., NMC 811 for $LiNi_{0.8}Mn_{0.1}Co_{0.1}O_2$), or any other, but not limited to the examples given, or a mixture thereof. $LiFePO_4$ (also referred to as LFP) is the most preferable for the cathode slurry of this invention.

The active anode material refers to a material that can absorb significant amounts of reduced lithium without any fundamental change in its structure. The active anode material may be a graphite phase, a silicon phase, or silicon oxide $SiO_x$ phase, where x is a positive number less than or equal to 2, or a combination of silicon and silicon oxide $SiO_x$ phases with a total atomic ratio between oxygen and silicon elements in the active anode material greater than 0 and less than 1.8, or other known active anode material as described, for example, in the review by H. Cheng; J. G. Shapter; Y. Li, G. Gao, *Recent progress of advanced anode materials of lithium-ion batteries. Journal of Energy Chemistry, Volume 57, 2021, pp. 451-468, ISSN 2095-4956, doi.org/10.1016/j.jechem.2020.08.056.*

The term "electrode slurry" as related to the provided methods for producing the cathode slurry and the anode slurry, and of the provided cathode slurry and anode slurry, shall refer to a cathode slurry or an anode slurry, and the "electrode" shall refer to a cathode or an anode, respectively.

Having both single-walled and/or double-walled carbon nanotubes and a gelling agent in the electrode slurry causes, due to a synergistic effect similar to that described above for the dispersion, a significant difference in the rheological properties of the slurry from the ideal (Newtonian) fluid in that the flow behavior index n for the electrode slurry is small. It is preferably not more than 0.37 with a flow consistency index K of at least 10 Pa·s$^n$, which means that the electrode slurry simultaneously has both very low viscosity, e.g., no more than 1 Pa·s at shear rates of 100 s$^{-1}$ or more, which are typical for the subsequent application of the electrode slurry to the conductive electrode plate, and high viscosity, e.g., at least 10 Pa·s at a shear rate of 1 s$^{-1}$ or less. This combination of properties of the electrode slurry is preferable and solves the technical problem of providing high viscosity during storage before use (application to the current collector of the electrode), high viscosity after the application to the current collector without spreading to ensure good quality on the edge of the active material layer of the electrode and, at the same time, low viscosity of the electrode slurry under the processing conditions defined for its application to the current collector.

In addition to water, the electrode slurry may contain another water-soluble organic solvent, if this is advantageous for the processing. The water-soluble organic solvents can include, but not limited to, N-methyl-2-pyrrolidone, ethylene carbonate, dimethyl sulfoxide, dimethylacetamide, etc. Additional water and/or water-soluble organic solvent can be added at the stage (C1) or (A1) of mixing the active electrode material and the dispersion containing single-walled and/or double-walled carbon nanotubes and a gelling agent, or can be added at an additional mixing stage preceding the mixing stage (C1) or (A1), or can be added at a separate mixing stage, after the mixing stage (C1) or (A1) and before the stage (C2) or (A2).

Binders can be further added to the electrode slurry to ensure the required plasticity and strength of the electrode material after drying. These additives, which are most typically high molecular (polymeric) materials, can be introduced in the form of solutions or suspensions, e.g., aqueous suspensions, suspensions based on N-methyl-2-pyrrolidone or another solvent, wherein the choice of the solvent depends on the features of the processing used. These additives can include, e.g., suspensions of fluoroplastics, latex of various rubbers, polyacrylic acid or its salts, such as Na or Li salt. Binders can be added at the stage (C1) or (A1) of mixing the active electrode material and the dispersion containing single-walled and/or double-walled carbon nanotubes and a gelling agent, or can be added at an additional mixing stage preceding the mixing stage (C1) or (A1), or can be added at a separate mixing stage, after the mixing stage (C1) or (A1) and before the stage (C2) or (A2).

To achieve the technical result, it is important that the dispersion used to produce the slurry at the stage (C1) or (A1) contains both a gelling agent and single-walled and/or double-walled carbon nanotubes, i.e., it is not enough for the dispersion for producing the electrode slurry to contain single-walled and/or double-walled carbon nanotubes and for the gelling agent to be added thereto during the production of the electrode slurry. For some implementations, the electrode slurry preferably further contains a gelling agent that is chemically similar to the one in the dispersion described above, i.e., containing water, a gelling agent and single-walled and/or double-walled carbon nanotubes and used for producing the electrode slurry, or another gelling agent is preferably added to the electrode slurry. In this case, the weight ratio of single-walled and/or double-walled carbon nanotubes to the gelling agent in the electrode slurry is less than the corresponding ratio in the dispersion used for its production. An additional gelling agent that is chemically similar to the one in the dispersion, or a different one, can be added at the stage (C1) or (A1) of mixing the active electrode material and the dispersion containing single-walled and/or double-walled carbon nanotubes, or can be added at an additional mixing stage preceding the mixing stage (C1) or (A1), or can be added at a separate mixing stage, after the mixing stage (C1) or (A1) and before the stage (C2) or (A2).

Summarizing the above three paragraphs, the method for producing the electrode slurry can comprise one or several additional stages of mixing with water and/or a water-soluble organic solvent and/or one or several binders and/or electrically conductive additives before stage (C2) or (A2). In some implementations, a solvent and/or one or several binders and/or electrically conductive additives are also preferably added to the mixture at the mixing stage (C1) or (A1).

Note that the substance acting as a gelling agent that changes the rheological properties of the electrode slurry, as described above, can also serve as a binder, e.g., Li salt of polyacrylic acid is both a gelling agent with a synergistic effect on the rheological properties of the slurry containing single-walled and/or double-walled carbon nanotubes, and a binder that improves the strength properties of the electrode slurry.

A preferable weight ratio of single-walled and/or double-walled carbon nanotubes to the gelling agent in the electrode slurry is at least 0.005 and not more than 10. For some implementations, the weight ratio of single-walled and/or double-walled carbon nanotubes to the gelling agent in the electrode slurry is preferably at least 0.01 and not more than 5. The most preferable weight ratio of single-walled and/or double-walled carbon nanotubes to the gelling agent in the electrode slurry is at least 0.03 and not more than 3. However, the synergistic effect producing the technical result is also achievable with a weight ratio of single-walled and/or double-walled carbon nanotubes to a gelling agent in the electrode slurry in the range of 0.005 to 0.03. The synergistic effect producing the technical result is also achievable with a weight ratio of single-walled and/or double-walled carbon nanotubes to a gelling agent in the electrode slurry in the range of 3 to 10.

In some implementations, the electrode slurry preferably further contains, at least 0.1 wt. % of electrically conductive additives other than single-walled and/or double-walled carbon nanotubes, e.g., graphite, carbon black, acetylene black, carbon fibers of various morphology, thickness and length, or metal particles not limited to these examples, e.g., such additives can ensure another benefit of reducing the internal resistance of the electrode.

The electrode slurry may comprise metal particles of Groups 8-11 of the periodic table of the elements, which are impurities in single-walled and/or double-walled carbon nanotubes due to the carbon nanotube production process. These electrically conductive additives, including metal particles, do not interfere the achievement of the technical result. Note, however, that metal particles are undesirable in most implementations, and the content of metal impurities of Groups 8-11 of the periodic table of the elements in the electrode slurry is preferably less than 1 wt. % of the single-walled and double-walled carbon nanotubes. For some implementations, the content of metal impurities of Groups 8-11 of the periodic table of the elements in the electrode slurry is preferably less than 0.1 wt. % of the single-walled and double-walled carbon nanotubes.

The present invention, in one embodiment, provides a method for producing a lithium-ion battery cathode, characterized in that the method comprises a sequence of stages for producing the above cathode slurry: (C1) mixing an active lithium-containing cathode component and the above dispersion containing water, a gelling agent and single-walled and/or double-walled carbon nanotubes, wherein the content of the single-walled and/or double-walled carbon nanotubes in the dispersion is from 0.3 to 2 wt. %, and the weight ratio of single-walled and/or double-walled carbon nanotubes to the gelling agent in the dispersion is at least 0.05 and not more than 10, and (C2) agitating the resultant mixture to produce a homogeneous slurry, and (C3) applying the resultant slurry to the current collector, (C4) drying the applied slurry until the cathode is formed, and (C5) compacting the cathode to the required density. The method of producing the cathode can comprise additional stages of introducing a binder and/or an additional solvent and/or a gelling agent that is chemically similar to the one in the dispersion, or a different one, which can be added at the stage of (C1) mixing the active lithium-containing cathode material and the dispersion containing single-walled and/or double-walled carbon nanotubes and a gelling agent, or can be added at a separate mixing stage preceding the mixing stage (C1), or at a separate mixing stage after the mixing stage (C1) before the stage (C2).

The present invention, in one embodiment, provides a method for producing a lithium-ion battery anode, characterized in that the method comprises a sequence of stages for producing the above anode slurry: (A1) mixing an active anode component and the above dispersion containing water, a gelling agent and single-walled and/or double-walled carbon nanotubes, wherein the content of the single-walled and/or double-walled carbon nanotubes in the dispersion is from 0.3 to 2 wt. %, and the weight ratio of single-walled and/or double-walled carbon nanotubes to the gelling agent in the dispersion is at least 0.05 and not more than 10, and (A2) agitating the resultant mixture to produce a homogeneous slurry, and (A3) applying the resultant slurry to the current collector, (A4) drying the applied slurry until the anode is formed; and (A5) compacting the anode to the required density. The method for producing an anode can comprise additional stages of introducing a binder and/or an additional solvent and/or a gelling agent that is chemically similar to the one in the dispersion, or a different one, which can be added at the stage of (A1) mixing the active anode material and the dispersion containing single-walled and/or double-walled carbon nanotubes and a gelling agent, or can be added at a separate mixing stage preceding the mixing stage (A1), or can be added at a separate mixing stage after the mixing stage (A1) before the stage (A2).

The present invention, in one embodiment, provides a lithium-ion battery cathode, produced by a method comprising a sequence of stages for producing the above cathode slurry: (C1) mixing an active lithium-containing component and the above dispersion containing water, a gelling agent and single-walled or double-walled carbon nanotubes, wherein the content of the single-walled and/or double-walled carbon nanotubes in the dispersion is from 0.3 to 2 wt. %, and the weight ratio of single-walled and/or double-walled carbon nanotubes to the gelling agent is at least 0.05 and not more than 10, and (C2) agitating the resultant mixture to produce a homogeneous slurry, and (C3) applying the resultant slurry to the current collector, (C4) drying the applied slurry until the cathode is formed, and (C5) compacting the cathode to the required density.

With both the gelling agent and single-walled and/or double-walled carbon nanotubes in the cathode slurry, which affect the viscosity as a function of shear rate and ensure both the stability of the cathode slurry and moderate viscosity under the conditions of its application to the current collector, a lithium-ion battery with the cathode of the invention demonstrates highly stable operation in successive charge-discharge cycles. For example, the battery capacity after 400 charge and discharge cycles with a current of 1C can be over 80% of the initial battery capacity, over 90% in some implementations, and over 95% in some implementations. The achievable battery stability depends on the active material in the battery cathode and on the battery anode.

The present invention, in one embodiment, provides a lithium-ion battery anode, characterized in that it is produced by a method comprising a sequence of stages for producing the above anode slurry: (A1) mixing an active anode component and the above dispersion containing water, a gelling agent and single-walled and/or double-walled carbon nanotubes, wherein the content of the single-walled and/or double-walled carbon nanotubes in the dispersion is from 0.3 to 2 wt. %, and the weight ratio of single-walled and/or double-walled carbon nanotubes to the gelling agent is at least 0.05 and not more than 10, and (A2) agitating the resultant mixture to produce a homogeneous slurry, and (A3) applying the resultant slurry to the current collector, (A4) drying the applied slurry until the anode is formed; and (A5) compacting the anode to the required density.

With both the gelling agent and single-walled and/or double-walled carbon nanotubes in the anode slurry, which affect the viscosity as a function of shear rate and ensure both the stability of the anode slurry and moderate viscosity under the conditions of its application to the current collector, a lithium-ion battery with the anode of the invention demonstrates highly stable operation in successive charge-discharge cycles. For example, the battery capacity after 400 charge and discharge cycles with a current rate of 1C can be over 80% of the initial battery capacity, over 90% in some implementations, and over 95% in some implementations. The achievable battery stability depends on the active material in the battery anode and on the battery cathode.

The invention is illustrated by accompanying Figures and Examples which are provided for illustration only and are not intended to limit possible implementations of the invention. For convenience, the basic information on the Examples is also summarized in Tables 1 and 2 that provide information on the compositions and properties of the dispersions and electrode slurries.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS OF THE INVENTION

Reference will now be made in detail to the preferred embodiments of the present invention, examples of which are illustrated in the accompanying drawings.

Example 1

Dispersion Production and Description.

Figure 1:
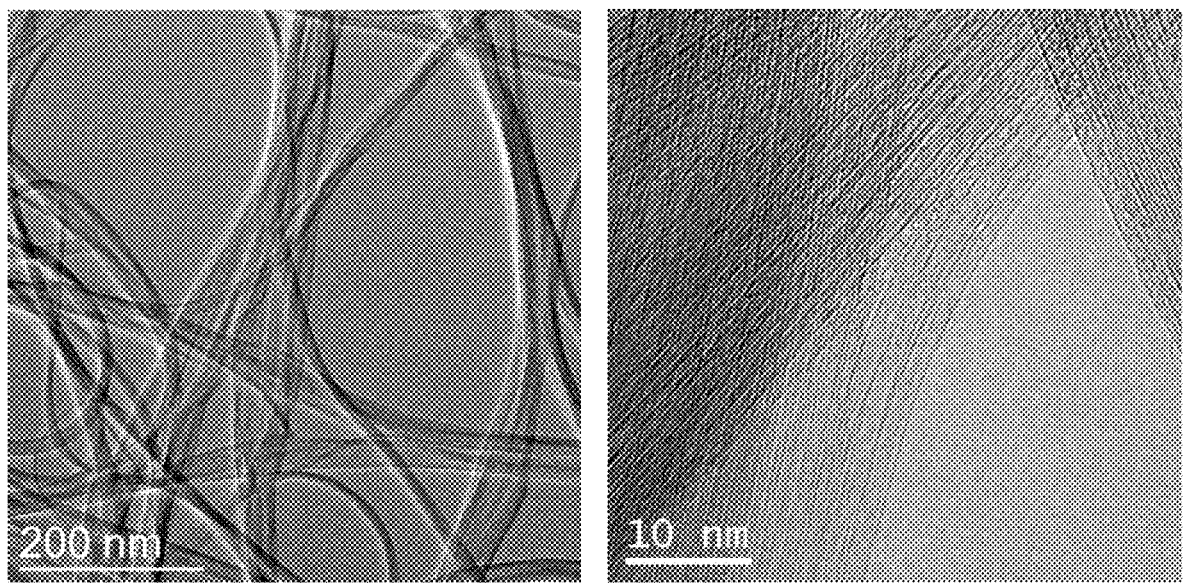
FIG. 1 illustrates transmission electron micrographs of Tuball™ single-walled carbon nanotubes in dispersions of Examples 1, 5 and 7, as well as Comparative Example 8.

The dispersion contains 0.6 wt. % of the Na-carboxymethylcellulose as gelling agent and 0.4 wt. % of single-walled carbon nanotubes and agglomerates thereof in water. The single-walled carbon nanotubes used for producing the dispersion are Tuball™ SWCNTs. The SWCNT diameter is in the range of 1.2 to 2.1 nm, with a mean diameter of 1.54 nm (the diameter was determined by TEM of the dry suspension matter, and by the positions of the absorption bands $S_{1-1}$ in the optical absorption spectrum of the suspension). Raman spectroscopy at 532 nm shows a strong G line at 1580 $cm^{-1}$ typical for single-walled carbon nanotubes, and a D line at ca. 1330 $cm^{-1}$ typical for other allotropic forms of carbon and defects of single-walled carbon nanotubes. The G/D line intensity ratio is 80. The specific surface area determined from nitrogen adsorption isotherms is 1220 $m^2/g$. See FIG. 1 for the transmission electron micrographs of the SWCNTs used. The SWCNTs for producing the dispersion were further modified with chlorine by the method described in the invention [RU2717516C2; MCD TECH, Mar. 23, 2020; IPC: C01B32/174, B82B3/00, B82B1/00]. The energy dispersion spectroscopy shows that the chlorine content in the Tuball SWCNT is 0.25 wt. %. The inductively coupled plasma atomic emission spectroscopy (ICP-AES) shows that the SWCNTs contain an impurity of 0.46 wt. % of iron, the Group 8 metal. The weight ratio of single-walled carbon nanotubes to the gelling agent in the slurry is 0.667.

The dispersion was produced by mixing the required proportions of water, carboxymethylcellulose Na salt, and SWCNTs and 10-fold dispersing in a NETZSCH Omega 500 high-pressure homogenizer at a pressure of 65 MPa and a dispersion transfer rate of 300 kg/h through the nozzle with a diameter of 700 μm. The shear rate in the nozzle is about $6 \cdot 10^5$ $s^{-1}$. The power consumption was 8 kW, the specific input energy at a stage (D) was about 27 W·h/kg. Between each two dispersion stages, the dispersion was held in a 50 liter tank at rest and agitated slowly by a gate agitator and at a shear rate of about 1 $s^{-1}$ for 10 minutes.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 912 Pa, and the loss modulus G"=190 Pa, which means that the dispersion is a highly viscous gel.

Figure 2:
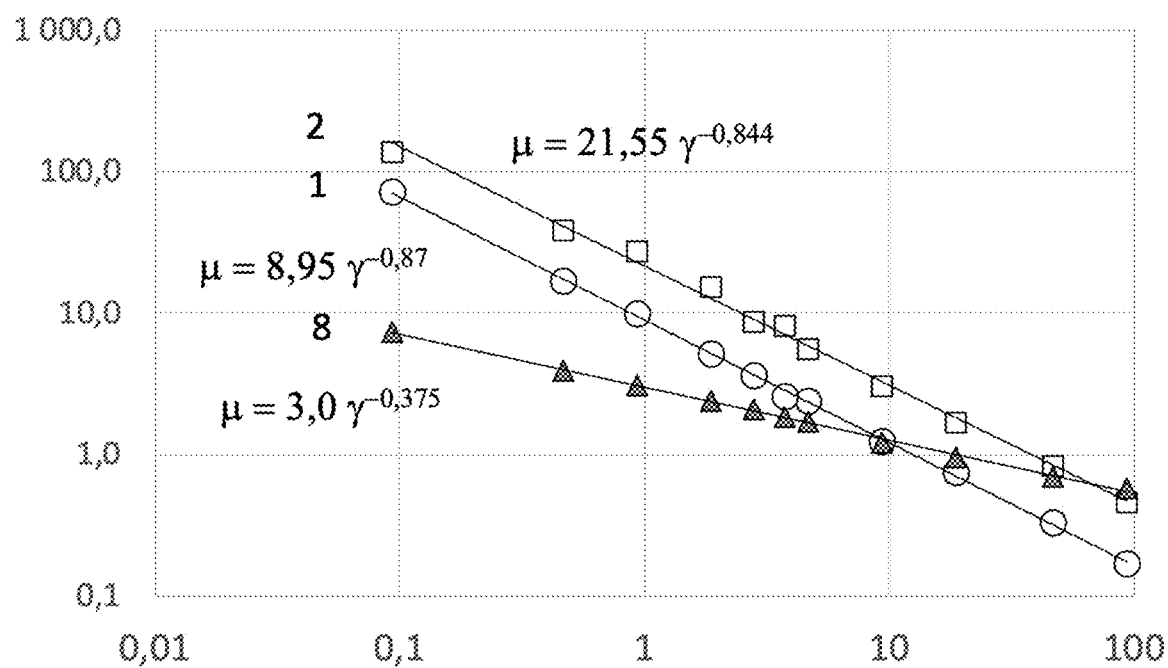
FIG. 2 illustrates dynamic viscosity (Pa·s) of dispersion of Example 1 (circles), Example 2 (squares), Comparative Example 8 (dark triangles) as a function of shear rate ($s^{-1}$).

The dispersion is characterized by the viscosity (Pa·s) as a function of shear rate ($s^{-1}$) provided in FIG. 2 as circles (curve 1). The viscosity was measured at a constant temperature of 25° C. using a Brookfield DV2-TLV viscometer with an SC4-21 spindle. The viscosity as a function of shear rate is well described by the Ostwald-de Waele power law in a range from 0.093 $s^{-1}$ to 93 $s^{-1}$. The flow behavior index n is 0.13, and the flow consistency index is 9.0 Pa·$s^{0.13}$. The dispersion viscosity in the area of low shear rates of less than 1/6.3 $s^{-1}$ is more than 43 Pa·s, and it is less than 0.72 Pa·s in the area of shear rates of more than 18.6 $s^{-1}$.

Using the dispersion to produce the cathode slurry and the cathode.

The dispersion was used to produce the cathode slurry containing 58.65 wt. % of active material LiFePO$_4$, 40 wt. % of water as solvent, 0.72 wt. % of styrene butadiene rubber binder, 0.6 wt. % of Na-carboxymethylcellulose gelling agent, and 0.03 wt. % of single-walled carbon nanotubes. The cathode slurry was produced by the sequence of stages:

adding 54 g of a solution containing 0.925 g of Na-carboxymethylcellulose and 53.075 g of water to 12.5 g of this dispersion, mixing on an overhead stirrer for 30 minutes (an additional stage of adding binder and solvent implemented before the stage (C1) and before the stage (C2));

mixing the resultant mixture with 97.75 g of the active component LiFePO$_4$ (stage C1);

adding 2.4 g of aqueous styrene butadiene rubber latex with a dry matter content of 50% (an additional binder adding stage implemented before the stage (C2));

agitating for 16 hours to produce a homogeneous slurry (stage C2).

Figure 3:
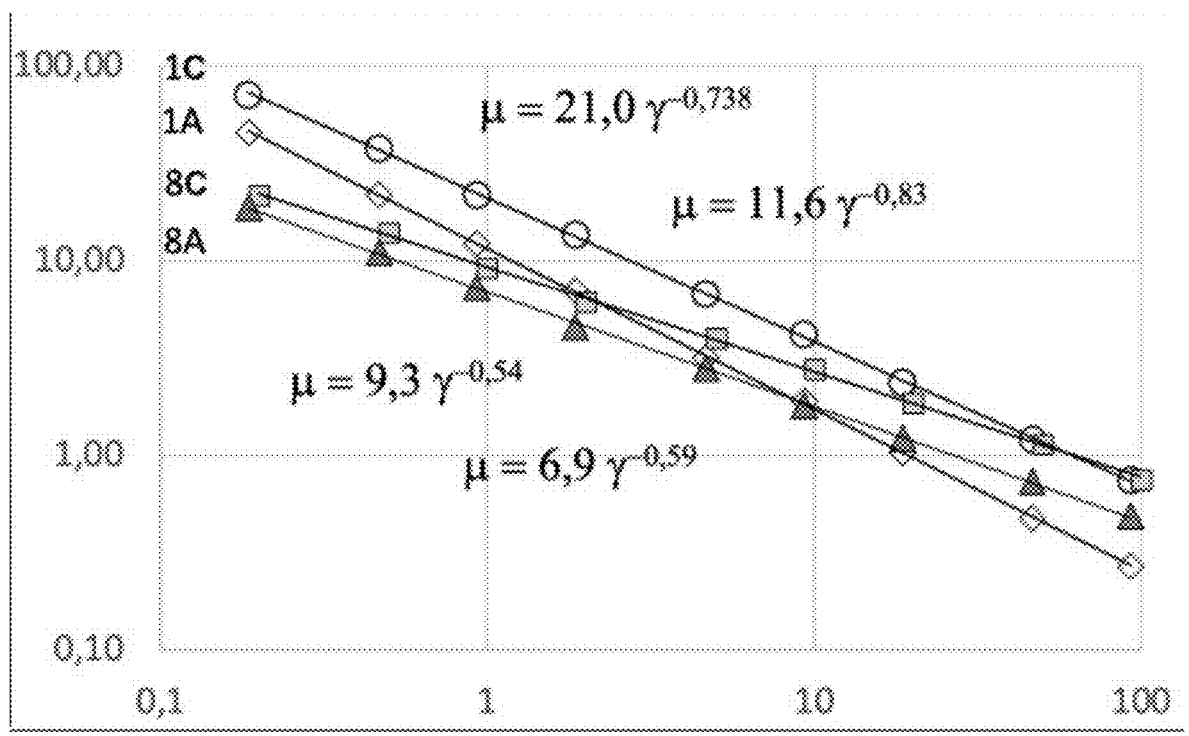
FIG. 3 illustrates dynamic viscosity (Pa·s) of cathode slurries of Example 1 (circles) and Comparative Example 8 (dark squares), and anode slurries of Example 1 (diamonds) and Comparative Example 8 (dark triangles) as a function of shear rate ($s^{-1}$).

With both the single-walled carbon nanotubes and the gelling agent in the dispersion used to produce the slurry, the resultant cathode slurry has the sharply pronounced dependence of viscosity on shear rate represented by circles (curve 1C) in FIG. 3. The flow behavior index is 0.26. The viscosity measured at a shear rate of 93 s$^{-1}$ is 0.76 Pa·s, and the dependence extrapolation to a shear rate of 100 s$^{-1}$ gives a viscosity estimate of about 0.70 Pa·s, which provides process capacity for the application to the current collector plate. At shear rates of less than 1 s$^{-1}$, the viscosity is more than 21 Pa·s, which ensures the slurry stability during storage before use, and the stability of the slurry layer on the current collector before drying.

The storage stability of the slurry was determined by the changing distribution of the solid particles content along the height of the slurry layer after the slurry storage in a 50 ml cylindrical test tube with a diameter of 30 mm. For this purpose, the slurry was put in the test tube, closed with a lid, and kept for 7 days under standard conditions (atmospheric pressure, 25° C.). After that, the upper third, the middle third, and the lower third of the test tube were collected with a pipette, and the weight fractions of water and solid non-volatile components in the samples were determined by drying. For the cathode slurry of this Example, the water content in the initial slurry was 40.0 wt. %, after one-week storage, the solvent content was 41.0 wt. % in the upper third, 39.8 wt. % in the middle part, and 39.2 wt. % in the lower part. The relative difference from the initial solvent content does not exceed 2.5%, which is significantly less than for the slurry described below in Comparative Example 8, and it is indicative of high stability of the resultant slurry. The slurry can be used to produce the cathode after 7-day storage.

Figure 4:
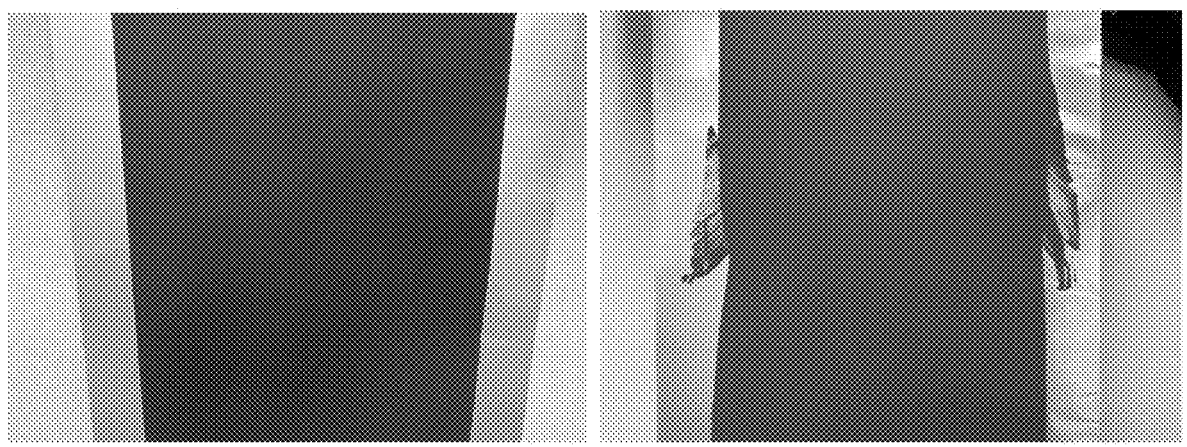
FIG. 4 illustrates photos of a cathode slurry layer applied to the current collector of Example 1 (left) and Comparative Example 8 (right).

The lithium-ion battery cathode was produced by applying the resultant slurry to an aluminum foil of the current collector, drying the applied slurry until the cathode is formed, and compacting the cathode on a calender with a force of 5 tons to the required density of 2.5 mg/cm$^2$. The photo of the cathode slurry layer applied to the current collector is shown in FIG. 4 (left photo). The cathode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 5% v/v of vinyl carbonate. The initial specific capacity of the cathode at a discharge current of 0.015 A/g of the cathode material is 158 mA·h/g of the cathode material.

Using the dispersion to produce the anode slurry and the anode.

The dispersion was used to produce the anode slurry containing 31.3 wt. % of graphite active material, 14.2 wt. % of silicon active material, 53.6 wt. % of water solvent, 0.35 wt. % of Na-carboxymethylcellulose gelling agent, 0.84 wt. % of styrene butadiene latex binder, and 0.23 wt. % of single-walled carbon nanotubes. The anode slurry was produced by the sequence of stages:

mixing 187.5 g of the dispersion, 1500 g of water, 1000 g of graphite powder, and 454.2 g of silicon powder, agitating for 10 hours (stage A1 where additional water is introduced);

adding 54 g of 50 wt. % of aqueous styrene butadiene latex suspension (an additional binder adding stage implemented before the stage (A2));

agitating for 4 hours to produce a homogeneous slurry (stage A2).

With both the single-walled carbon nanotubes and the gelling agent present, the resultant anode slurry also has a sharply pronounced dependence of viscosity on shear rate represented by diamonds (curve 1A) in FIG. 3. The dependence follows the Ostwald-de Waele power law with a flow behavior index 0.17 and a flow consistency index 11.5 Pa·s$^{0.17}$. With a shear rate of 100 s$^{-1}$, the slurry viscosity is less than 0.26 Pa·s, which provides process capacity for the application to the current collector plate. At shear rates of less than 1 s$^{-1}$, the viscosity is more than 11.6 Pa·s, which ensures the slurry stability during storage before use, and the stability of the slurry layer on the current collector before drying.

The storage stability of the anode slurry was tested by the above method for the cathode slurry. Within a week, the water content in the upper third of the slurry increased from 53.6 wt. % to 54.2 wt. %, i.e., less than 2% relative of the initial value. This is indicative of a high slurry stability.

For the anode production, the resultant anode slurry was applied to a copper foil using a doctor blade, dried at a temperature of 40° C. for 1 hour and compacted on a calender with a force of 5 tons to an anode material density of 1.4 g/cm$^3$. The load of the active material on the anode is 8.5 mg/cm$^2$. The anode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 1% v/v of vinyl carbonate. The initial specific capacity of the anode at a charge current of 0.03 A/g of the anode material is 342 mA·h/g of the anode material.

Figure 5:
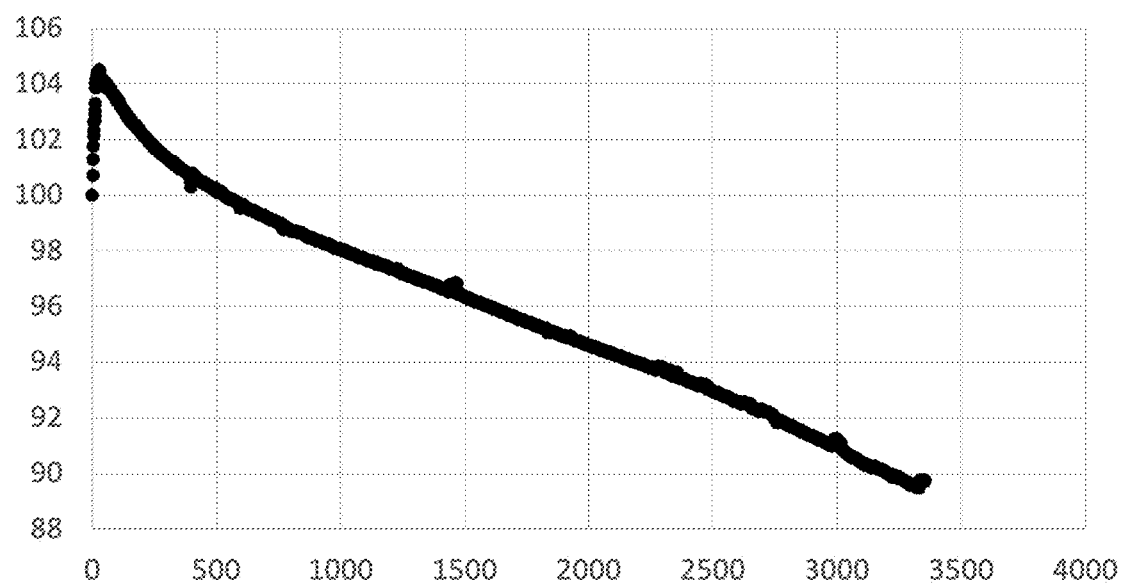
FIG. 5 illustrates capacity related to initial capacity as a function of the number of charge-discharge cycles (charge rate 1C, discharge rate 1C) of the lithium-ion battery with cathode and anode of Example 1.

The lithium-ion battery was assembled from the resultant cathode and anode. A 16 μm thick polypropylene separator was used. A 0.8 M solution of LiPF$_6$ in the mixture of propylene carbonate:ethyl methyl carbonate:dimethyl carbonate solvents in a volume ratio of 1:1:1 with additional 1% v/v of vinyl carbonate was used as an electrolyte. The initial battery capacity at a discharge rate of 0.1 C was 324 mA·h. The capacity (referred to the initial capacity) as a function of the number of charge-discharge cycles (charge current 324 mA, discharge current 324 mA) is shown in FIG. 5. The battery capacity is more than 90% of the initial capacity after 3000 cycles.

Example 2

The dispersion contains 0.6 wt. % of the polyvinylpyrrolidone (PVP) gelling agent and 0.3 wt. % of single-walled carbon nanotubes and agglomerates thereof, the rest is water. The dispersion was produced using Tuball™ SWCNTs subjected to multistage chemical purification and boiling in nitric acid for 4 hours. The inductively coupled plasma atomic emission spectroscopy (ICP-AES) shows that the content of Fe in the SWCNTs is 60 ppm or 0.06 wt. %. The potentiometric titration shows that the SWCNT surface after such treatment contains about 0.62 wt. % of carboxyl groups. The SWCNT diameter is distributed in a range of 1.2 to 2.1 nm with a mean diameter of 1.60 nm, the G/D line intensity ratio is 24, and the specific surface area determined from nitrogen adsorption isotherms is 1280 m$^2$/g. The weight ratio of single-walled carbon nanotubes to the gelling agent in the slurry is 0.667.

The dispersion was produced by mixing the required proportions of water, polyvinylpyrrolidone and SWCNT, 8-fold repeating the alternating stages of dispersing in a Chaoli GJB500 high-pressure homogenizer and holding at rest in a 65 liter tank while agitating slowly by a gate agitator at a shear rate of about 1 s$^{-1}$ for 12 minutes. The dispersion occurred at a pressure of 60 MPa, a dispersion transfer flow rate of 300 l/h, and a shear rate in the valve nozzle of about 6·10$^5$ s$^{-1}$. The measured power consumption was 16 kW, the specific input energy at the stage (D) was about 53 W·h/kg.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 2460 Pa, and the loss modulus G"=390 Pa, which means that the dispersion is a highly viscous gel.

The dispersion is characterized by the viscosity (Pa·s) as a function of shear rate (s$^{-1}$) provided in FIG. 2 as square markers. The flow behavior index n is 0.156, and the flow consistency index is 21.6 Pa·s$^{0.156}$. The dispersion viscosity in the area of low shear rates of less than 1/6.3 s$^{-1}$ is more than 100 Pa·s, and it is less than 1.9 Pa·s in the area of shear rates of more than 18.6 s$^{-1}$.

The dispersion was used to produce the cathode slurry containing 61 wt. % of active material LiNi$_{0.33}$Co$_{0.33}$Mn$_{0.33}$O$_2$ (NCM111), 37.7 wt. % of water solvent, 0.62 wt. % of styrene butadiene rubber binder, 0.62 wt. % of Na-carboxymethylcellulose binder, 0.047 wt. % of PVP gelling agent, and 0.023 wt. % of single-walled carbon nanotubes. The cathode slurry was produced by the sequence of stages:

adding 240 g of a solution containing 5 g of Na-carboxymethylcellulose and 235 g of water to 62.5 g of this dispersion, mixing on an overhead stirrer for 30 minutes (an additional binder and solvent adding stage implemented before the stage (C1) and before the stage (C2));

mixing the resultant mixture with 488 g of the active component NCM111 (stage C1);

adding 10 g of aqueous styrene butadiene rubber latex with a dry matter content of 50% (an additional binder adding stage implemented before the stage (C2));

agitating for 16 hours to produce a homogeneous slurry (stage C2).

With both the single-walled carbon nanotubes and the gelling agent in the dispersion used to produce the slurry, the resultant cathode slurry has a sharply pronounced dependence of viscosity on shear rate, which is well described by the power law with a flow behavior index 0.24 and a flow consistency index 18.8 Pa·s. With a shear rate of 100 s$^{-1}$, the dynamic viscosity is about 0.55 Pa·s, which provides process capacity for the application to the current collector plate. At shear rates of not more than 1 s$^{-1}$, the viscosity is at least 18.8 Pa·s, which ensures the slurry stability during storage before use, and the stability of the slurry layer on the current collector before drying.

The slurry storage stability was determined by the method described in Example 1. For the cathode slurry of this Example, the water content in the initial slurry was 37.7 wt. %, after one-week storage, the water content was 38.2 wt. % in the upper third, 37.9 wt. % in the middle part, and 37.0 wt. % in the lower part. The relative difference from the initial solvent content does not exceed 2%, which is within the measurement error. The slurry can be used to produce the cathode after 7-day storage.

The lithium-ion battery cathode was produced by applying the resultant slurry to an aluminum foil of the current collector, drying the applied slurry until the cathode is formed, and compacting the cathode on a calender with a force of 5 tons to the required density of 3.6 mg/cm$^2$. The cathode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 1% v/v of vinyl carbonate. The initial specific capacity of the cathode at a discharge current of 0.015 A/g of the cathode material is 155 mA·h/g of the cathode material.

The dispersion was used to produce the anode slurry containing 26.6 wt. % of graphite active material, 16.2 wt. % of silicon active material, 55.5 wt. % of water solvent, 0.33 wt. % of polyvinylpyrrolidone gelling agent, 0.49% of Na-carboxymethylcellulose binder, 0.66 wt. % of styrene butadiene latex binder, and 0.17 wt. % of single-walled carbon nanotubes. The anode slurry was produced by the sequence of stages:

adding 367 g of silicon powder and 600 g of graphite powder to 1250 g of the dispersion, agitating for 1 hour (stage (A1));

adding 11 g of Na-carboxymethylcellulose powder, agitating for 1 hour; (an additional binder adding stage implemented before the stage (A2));

adding 30 g of 50 wt. % of aqueous butadiene styrene latex suspension (an additional binder adding stage implemented before the stage (A2));

agitating for 16 hours to produce a homogeneous slurry (stage A2).

For the anode production, the resultant anode slurry was applied to a copper foil using a doctor blade, dried at a temperature of 80° C. for 15 minutes and compacted on a calender with a force of 5 tons to an anode material density of 1.0 g/cm$^3$. The anode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 10% v/v of fluoroethylene carbonate. The initial specific capacity of the anode at a charge current of 0.3 A/g of the anode material is 1360 mA·h/g of the anode material.

With both the single-walled carbon nanotubes and the gelling agent present, the resultant anode slurry has a sharply pronounced dependence of viscosity on shear rate, which follows the Ostwald-de Waele power law with a flow behavior index 0.19 and a flow consistency index 12.3 Pa·s$^{0.19}$. With a shear rate of 100 s$^{-1}$, the slurry viscosity is less than 0.30 Pa·s, which provides process capacity for the application to the current collector plate. At shear rates of less than 1 s$^{-1}$, the viscosity is more than 12.3 Pa·s, which ensures the slurry stability during storage before use, and the stability of the slurry layer on the current collector before drying.

The storage stability of the anode slurry was tested by the above method for the cathode slurry. Within a week, the water content in the upper third of the slurry increased from 55.6 wt. % to 57.0 wt. %, i.e., less than 3 rel. % of the initial value. This is indicative of a high slurry stability.

Figure 6:
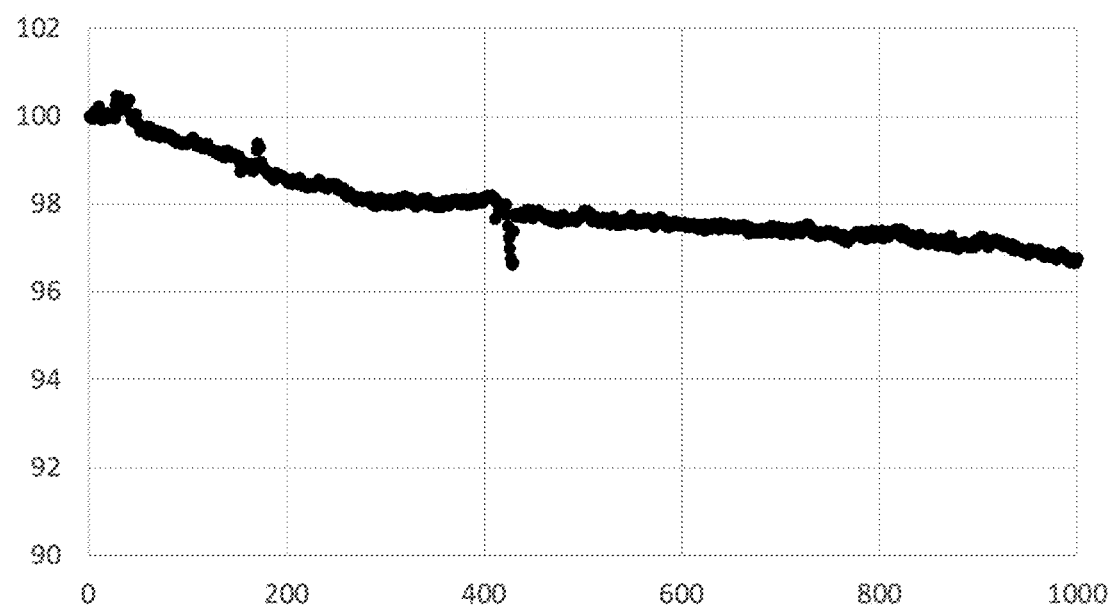
FIG. 6 illustrates capacity related to initial capacity as a function of the number of charge-discharge cycles (charge rate 1C, discharge rate 1C) of the lithium-ion battery with cathode and anode of Example 2.

The lithium-ion battery was assembled from the resultant cathode and anode. A 16 µm thick polypropylene separator was used. A 1.5 M solution of $LiPF_6$ in the mixture of propylene carbonate:ethyl methyl carbonate:dimethyl carbonate solvents in a volume ratio of 1:1:1 with additional 20% v/v of vinyl carbonate was used as an electrolyte. The initial battery capacity at a discharge rate of 0.1 C was 525 mA·h. The capacity (referred to the initial capacity) as a function of the number of charge-discharge cycles (charge current 525 mA, discharge current 525 mA) is shown in FIG. 6. The battery capacity is more than 96% of the initial capacity after 1000 cycles.

Example 3

The dispersion contains 2 wt. % of the polyacrylic acid Na salt gelling agent and 0.3 wt. % of single-walled carbon nanotubes and agglomerates thereof, and water to balance. The single-walled carbon nanotubes used for producing the dispersion are Tuball™ SWCNTs. The SWCNT diameter is distributed in a range of 1.2 to 2.1 nm with a mean diameter of 1.62 nm, the G/D line intensity ratio is 46, and the specific surface area determined from nitrogen adsorption isotherms is 580 m²/g. The thermogravimetry data in the 5% oxygen flow in Ar show that the ash residue after the material oxidation at 950° C. is about 20 wt. %. X-ray diffraction shows that the ash residue predominantly contains iron oxide $Fe_2O_3$, and the SWCNTs contain a nanodispersed metallic iron phase. The energy dispersive X-ray spectroscopy shows that the Fe content in the SWCNTs is 14.2 wt. %, which is consistent with the data on ash residue weight.

The dispersion was produced by mixing the required proportions of water, Na salt of polyacrylic acid, and SWCNTs and 15-fold repeating the alternating stages: dispersing in a rotary pulsation apparatus (RPA) with a power consumption of 32 kW, a rotor diameter of 190 mm, a gap between the rotor and the stator of 700 µm, and a rotor speed of 2940 rpm, ultrasonic treatment in a 100 liter tank at a frequency of 40 kHz and the acoustic input power of the sonotrode 1800 W, and at rest in a 220 liter tank while agitating slowly by an anchor agitator at 30 rpm and a shear rate of about 2 s$^{-1}$. The rate of dispersion circulation between the RPA, the probe sonicator, and the tank is 1000 kg/h; about 32 W·h/kg of energy is applied to the dispersion in the RPA at the dispersion stage (D); about 1.8 W·h/kg is applied to the dispersion at the ultrasonic treatment stage (D); the mean tank residence time of the dispersion at a shear rate of about 2 s$^{-1}$ is about 13 minutes at the stage (R).

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 1150 Pa, and the loss modulus G"=410 Pa, which means that the dispersion is a highly viscous gel.

The dispersion is characterized by a sharp decrease in viscosity with higher shear rate, which is well described by the power law. The flow behavior index n is 0.23, and the flow consistency index is 19.0 Pa·s$^{0.23}$. The dispersion viscosity is more than 78 Pa·s in the area of low shear rates of less than 1/6.3 s$^{-1}$, and it is less than 0.53 Pa·s in the area of shear rates of more than 18.6 s$^{-1}$, which, on the one hand, provides high dispersion storage stability and, on the other hand, its processability in various implementations, including the production of electrode slurries for the production of lithium-ion battery electrodes.

The dispersion was used to produce the cathode slurry containing 29.9 wt. % of active material $LiCo_2O_4$ (LCO), 68.6 wt. % of water solvent, 1.25 wt. % of Na-PAA gelling agent, and 0.19 wt. % of single-walled carbon nanotubes. The cathode slurry was produced by the sequence of stages:
  adding 235 g of water to 2000 g of the dispersion, mixing on an overhead stirrer for 30 minutes (an additional solvent adding stage implemented before the stage (C1) and before the stage (C2));
  mixing the resultant mixture with 954 g of the active component LCO (stage C1);
  agitating for 16 hours to produce a homogeneous slurry (stage C2).

With both the single-walled carbon nanotubes and the gelling agent in the dispersion used to produce the slurry, the resultant cathode slurry has a sharply pronounced dependence of viscosity on shear rate, which is well described by the power law with a flow behavior index 0.20 and a flow consistency index 12.1 Pa·s$^{0.2}$. With a shear rate of 100 s$^{-1}$, the dynamic viscosity is about 0.30 Pa·s, which provides process capacity for the application to the current collector plate. At shear rates of not more than 1 s$^{-1}$, the viscosity is at least 12.1 Pa·s, which ensures the slurry stability during storage before use, and the stability of the slurry layer on the current collector before drying.

The slurry storage stability was determined by the method described in Example 1. For the cathode slurry of this Example, the water content in the initial slurry was 68.6 wt. %, after one-week storage, the water content was 70.2 wt. % in the upper third, 69.0 wt. % in the middle part, and 66.4 wt. % in the lower part. The difference from the initial content of the solvent does not exceed 3.5 rel. %. The slurry can be used to produce the cathode after 7-day storage.

The lithium-ion battery cathode was produced by applying the resultant slurry to an aluminum foil of the current collector, drying the applied slurry until the cathode is formed, and compacting the cathode on a calender with a force of 10 tons to the required density of 4.2 mg/cm². The cathode properties were determined by assembling a cell with a Li cathode and the Li reference electrode, and an electrolyte, which is a 1.2 M solution of $LiPF_6$ in the mixture of propylene carbonate:ethyl methyl carbonate:dimethyl carbonate solvents with a volume ratio of 1:1:1 and additional 1% v/v of vinyl carbonate. The initial specific capacity of the cathode at a discharge current of 0.0125 A/g of the cathode material is 123 mA·h/g of the cathode material.

The dispersion was used to produce the anode slurry containing 18.5 wt. % of silicon oxide ($SiO_x$) active material, 79.7 wt. % of water solvent, 1.63 wt. % of PAA gelling agent, and 0.24 wt. % of single-walled carbon nanotubes. The anode slurry was produced by the sequence of stages:
  adding 181 g of $SiO_x$ powder to 800 g of this dispersion (stage A1);

agitating for 16 hours to produce a homogeneous slurry (stage A2).

With both the single-walled carbon nanotubes and the gelling agent present, the resultant anode slurry has a sharply pronounced dependence of viscosity on shear rate, which follows the Ostwald-de Waele power law with a flow behavior index 0.17 and a flow consistency index 10.5 Pa·s$^{0.17}$. With a shear rate of 100 s$^{-1}$, the slurry viscosity is less than 0.23 Pa·s, which provides process capacity for the application to the current collector plate. At shear rates of less than 1 s$^{-1}$, the viscosity is more than 10.5 Pa·s, which ensures the slurry stability during storage before use, and the stability of the slurry layer on the current collector before drying.

The storage stability of the anode slurry was tested by the above method for the cathode slurry. Within a week, the water content in the upper third of the slurry increased from 80 wt. % to 81 wt. %, i.e., less than 2 rel. % of the initial value. This is indicative of a high slurry stability.

For the anode production, the resultant anode slurry was applied to a copper foil using a doctor blade, dried at a temperature of 70° C. for 15 minutes and compacted on a calender with a force of 5 tons to an anode material density of 1.3 g/cm$^3$. The anode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 10% v/v of fluoroethylene carbonate. The initial specific capacity of the anode at a charge current of 0.1 A/g of the anode material is 1652 mA·h/g of the anode material.

Figure 7:
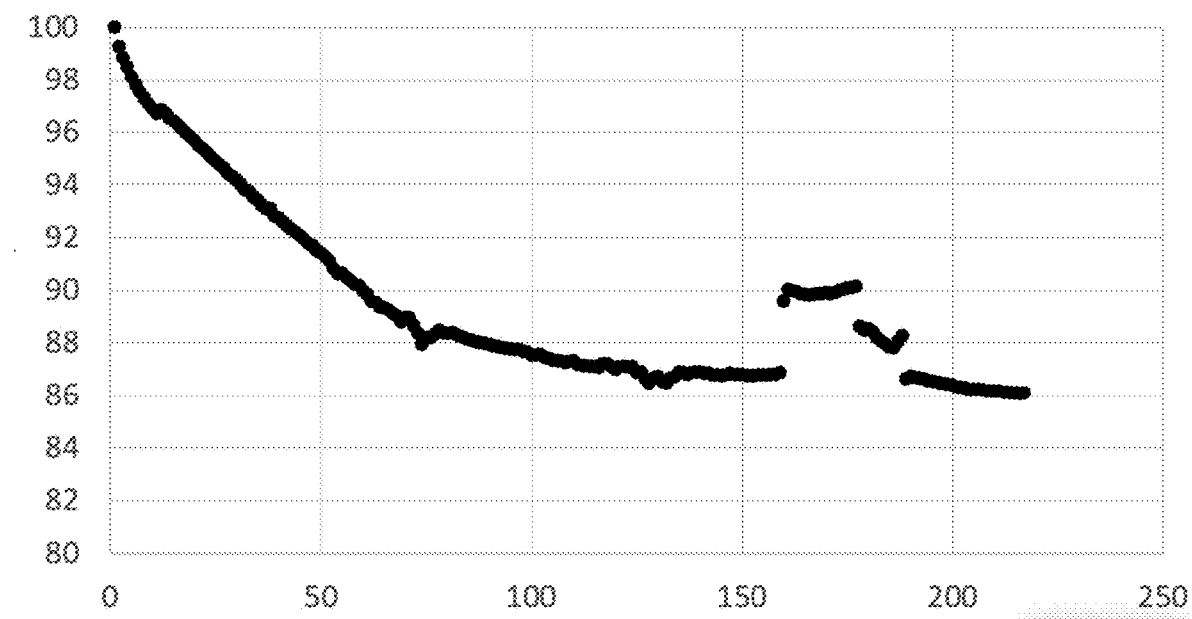
FIG. 7 illustrates capacity related to initial capacity as a function of the number of charge-discharge cycles (charge rate 1C, discharge rate 1C) of the lithium-ion battery with cathode and anode of Example 3.

The lithium-ion battery was assembled from the resultant cathode and anode. A 16 μm thick polypropylene separator was used. A 1.5 M solution of LiPF$_6$ in the mixture of propylene carbonate:ethyl methyl carbonate:dimethyl carbonate solvents in a volume ratio of 1:1:1 with additional 20% v/v of fluoroethylene carbonate was used as an electrolyte. The initial battery capacity at a discharge rate of 0.1 C was 1200 mA·h. The capacity (referred to the initial capacity) as a function of the number of charge-discharge cycles (charge current 1200 mA, discharge current 1200 mA) is shown in FIG. 7. The battery capacity is more than 85% of the initial capacity after 215 cycles.

Example 4

Figure 8:
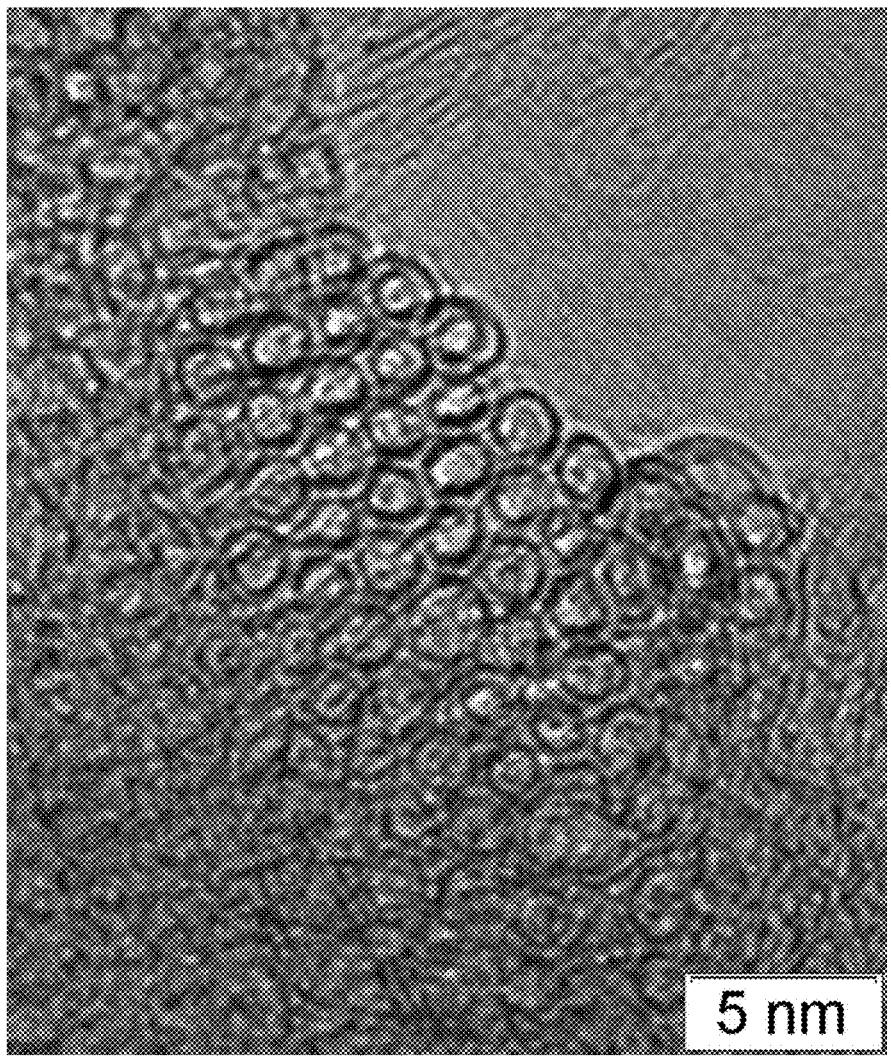
FIG. 8 illustrates transmission electron micrographs of single-walled and double-walled carbon nanotubes of dispersions of Example 4.

The dispersion is similar to the one described in Example 1, but contains a mixture of single-walled and double-walled carbon nanotubes with diameters from 1.2 to 2.8 nm and a mean diameter of 1.8 nm (the diameter was determined by TEM of the dry suspension matter and from the positions of the radial breathing mode (RBM) lines in the Raman spectra). The intensity ratio of the G/D lines in the Raman spectrum of light with a wavelength of 532 nm is 34. The availability of double-walled carbon nanotubes bundled together with single-walled carbon nanotubes is confirmed by the electron micrographs provided in FIG. 8. The concentration of carbon nanotubes in the dispersion is 0.4 wt. %. The dispersion also contains 0.6 wt. % of the carboxymethylcellulose Na salt gelling agent. The weight ratio of single-walled carbon nanotubes to the gelling agent in the slurry is 0.667.

The dispersion was produced by mixing the required proportions of water, Na-carboxymethylcellulose, and SWCNTs and DWCNTs, and 32-fold dispersing in a NETZSCH Omega 500 high-pressure homogenizer at a pressure of 65 MPa and a dispersion transfer rate of 300 kg/h through the nozzle with a diameter of 700 μm. The shear rate in the nozzle is about 6·10$^5$ s$^{-1}$. The power consumption was 8 kW, the specific input energy at the stage (D) was about 27 W·h/kg. Between each two dispersion stages, the dispersion was held in a 50 liter tank at rest and agitated slowly by a gate agitator and at a shear rate of about 1 s$^{-1}$ for 10 minutes.

The dispersion is characterized by lower viscosity with increasing shear rate. The viscosity was measured at a constant temperature of 25° C. using a Brookfield DV2-TLV viscometer with an SC4-21 spindle. The viscosity as a function of shear rate is well described by the Ostwald-de Waele power law in a range from 0.093 s$^{-1}$ to 100 s$^{-1}$. The flow behavior index n is 0.19, and the flow consistency index is 4.9 Pa·s$^{0.19}$. The dispersion viscosity in the area of low shear rates of less than 1/6.3 s$^{-1}$ is more than 22 Pa·s, and it is less than 0.46 Pa·s in the area of shear rates of more than 18.6 s$^{-1}$.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 176 Pa, and the loss modulus G"=28 Pa, which means that the dispersion is a highly viscous gel.

The dispersion was used to produce the cathode slurry containing 58.65 wt. % of active material LiFePO$_4$, 40 wt. % of water solvent, 0.72 wt. % of styrene butadiene rubber binder, 0.6 wt. % of Na-carboxymethylcellulose gelling agent, and 0.03 wt. % of single-walled and double-walled carbon nanotubes. The production sequence was similar to Example 1.

With both the single-walled and double-walled carbon nanotubes and the gelling agent in the dispersion used to produce the slurry, the resultant cathode slurry has a sharply pronounced dependence of viscosity on shear rate, which is well described by the power law. The flow behavior index is 0.29, and the flow consistency index is 18 Pa·s$^{0.29}$. The viscosity measured at a shear rate of 93 s$^{-1}$ is 0.72 Pa·s, and the dependence extrapolation to a shear rate of 100 s$^{-1}$ gives a viscosity estimate of about 0.68 Pa·s, which provides process capacity for the application to the current collector plate. At shear rates of not more than 1 s$^{-1}$, the viscosity is at least 18 Pa·s, which ensures the slurry stability during storage before use, and the stability of the slurry layer on the current collector before drying.

The slurry storage stability was determined similarly to Example 1. The water content in the initial slurry was 40.0 wt. %, after one-week storage, the solvent content was 41.4 wt. % in the upper third, 39.7 wt. % in the middle part, and 38.8 wt. % in the lower part. The difference from the initial solvent content does not exceed 3 rel. %, which is significantly less than for the slurry described below in Comparative Example 8, and it is indicative of high stability of the resultant slurry. The slurry can be used to produce the cathode after 7-day storage.

The lithium-ion battery cathode was produced similarly to Example 1. The initial specific capacity of the cathode at a discharge current of 0.015 A/g of the cathode material is 152 mA·h/g of the cathode material.

The dispersion was used to produce the anode slurry containing 31.3 wt. % of graphite active material, 14.2 wt.

% of silicon active material, 53.6 wt. % of water solvent, 0.35 wt. % of Na-carboxymethylcellulose gelling agent, 0.84 wt. % of styrene butadiene latex binder, and 0.23 wt. % of single-walled and double-walled carbon nanotubes. The anode slurry production procedure was similar to Example 1.

With both the single-walled carbon nanotubes and the gelling agent in the dispersion, the resultant anode slurry has a sharply pronounced dependence of viscosity on shear rate, which is described by the power law. The flow behavior index is 0.2, and the flow consistency index is 11.0 Pa·s$^{0.2}$. With a shear rate of 100 s$^{-1}$, the slurry viscosity is less than 0.28 Pa·s, which provides process capacity for the application to the current collector plate. At shear rates of less than 1 s$^{-1}$, the viscosity is more than 11.0 Pa·s, which ensures the slurry stability during storage before use, and the stability of the slurry layer on the current collector before drying.

The storage stability of the anode slurry was tested by the above method in Example 1. Within a week, the water content in the upper third of the slurry increased from 53.6 wt. % to 54.7 wt. %, i.e., less than 2 rel. % of the initial value. This is indicative of a high slurry stability.

The anode was produced similarly to Example 1. The initial specific capacity of the anode at a charge current of 0.03 A/g of the anode material is 334 mA·h/g of the anode material.

The lithium-ion battery was assembled from the resultant cathode and anode. A 16 μm thick polypropylene separator was used. A 0.8 M solution of LiPF$_6$ in the mixture of propylene carbonate:ethyl methyl carbonate:dimethyl carbonate solvents in a volume ratio of 1:1:1 with additional 1% v/v of vinyl carbonate was used as an electrolyte. The initial battery capacity at a discharge rate of 0.03 C was 314 mA·h. The battery capacity is more than 92% of the initial capacity after 400 charge-discharge cycles (charge current 314 mA, discharge current 314 mA).

Example 5

The dispersion contains 0.2 wt. % of the carboxymethylcellulose Li salt gelling agent and 2 wt. % of single-walled carbon nanotubes and agglomerates thereof in water. The dispersion was produced using Tuball™ SWCNTs modified with chlorine, as described in Example 1. The weight ratio of single-walled carbon nanotubes to the gelling agent in the slurry is 10.

The dispersion was produced by mixing the required proportions of water, polyvinylpyrrolidone and SWCNT, and 32-fold circulating the dispersion at a dispersion transfer rate of 300 kg/h between the Chaoli GJB500 high-pressure disperser (stage (D)) and the 50 liter tank where the dispersion was at rest (stage (R)) while being agitated slowly by a gate agitator at a shear rate of about 2 s$^{-1}$. The estimated shear rate in the disperser is over 600000 s$^{-1}$, the measured power consumption was 19 kW. The specific input energy in the dispersion cycle is about 63 W·h/kg. The mean residence time in the tank at the stage (R) was about 10 minutes.

The viscosity was measured at a constant temperature of 25° C. using a Brookfield DV2-TLV viscometer with an SC4-21 spindle. The viscosity as a function of shear rate is well described by the Ostwald-de Waele power law in a range from 0.093 s$^{-1}$ to 100 s$^{-1}$. The flow behavior index n is 0.33, and the flow consistency index is 13.5 Pa·s$^{0.33}$. The dispersion viscosity in the area of low shear rates of less than 1/6.3 s$^{-1}$ is more than 45 Pa·s, and it is less than 1.9 Pa·s in the area of shear rates of more than 18.6 s$^{-1}$.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 980 Pa, and the loss modulus G"=460 Pa, which means that the dispersion is a highly viscous gel.

The dispersion was used to produce the cathode slurry containing 55.1 wt. % of active material LiFePO$_4$, 42.3 wt. % of water solvent, 0.57 wt. % of styrene butadiene rubber binder, 1.22 wt. % of carboxymethylcellulose Li salt gelling agent and binder, and 0.85 wt. % of single-walled carbon nanotubes. The cathode slurry was produced by the sequence of stages:

- adding 20 g of Li-carboxymethylcellulose powder and 968.5 g of active component LiFePO$_4$ (stage (C1) where an additional binder is introduced) to 750 g of this dispersion;
- adding 20 g of aqueous styrene butadiene rubber latex suspension with a dry matter content of 50 wt. % (an additional binder adding stage implemented before the stage (C2));
- agitating for 16 hours to produce a homogeneous slurry (stage C2).

With both the single-walled carbon nanotubes and the gelling agent in the dispersion used to produce the slurry, the resultant cathode slurry has a sharply pronounced dependence of viscosity on shear rate, which is well described by the power law with a flow behavior index 0.18 and a flow consistency index 19.9 Pa·s$^{0.18}$. With a shear rate of 100 s$^{-1}$, the dynamic viscosity is about 0.46 Pa·s, which provides process capacity for the application to the current collector plate. At shear rates of not more than 1 s$^{-1}$, the viscosity is at least 19.9 Pa·s, which ensures the slurry stability during storage before use, and the stability of the slurry layer on the current collector before drying.

The slurry storage stability was determined by the method described in Example 1. For the cathode slurry of this Example, the water content in the initial slurry was 42.3 wt. %, after one-week storage, the water content was 43.0 wt. % in the upper third, 42.5 wt. % in the middle part, and 41.5 wt. % in the lower part. The difference from the initial content of the solvent does not exceed 2 rel. %. The slurry can be used to produce the cathode after 7-day storage.

The lithium-ion battery cathode was produced using the resultant cathode slurry similarly to Example 1. The initial specific capacity of the cathode at a discharge current of 0.15 A/g of the cathode material is 147 mA·h/g of the cathode material.

Using the dispersion to produce the anode slurry and the anode.

The dispersion was used to produce the anode slurry containing 18 wt. % of graphite active material, 32.9 wt. % of silicon oxide active material, 44.6 wt. % of water solvent, 3.1 wt. % of carboxymethylcellulose Li salt gelling agent and binder, 0.6 wt. % of styrene butadiene rubber binder, and 0.9 wt. % of single-walled carbon nanotubes. The anode slurry was produced by the sequence of stages:

- mixing 37.5 g of the dispersion, 2.5 g of carboxymethylcellulose Li salt powder, 15 g of graphite powder, and 27.4 g of silicon powder, agitating for 1 hour (stage (C1) where an additional binder is introduced);

adding 1 g of aqueous styrene butadiene rubber latex suspension with a dry matter content of 50 wt. % (an additional stage of adding a binder and water, implemented before the stage (A2));

agitating for 10 hours to produce a homogeneous slurry (stage A2).

With both the single-walled carbon nanotubes and the gelling agent present, the resultant anode slurry also has a sharply pronounced dependence of viscosity on shear rate, which is described by the power law. The flow behavior index is 0.17, and the flow consistency index is 20.4 Pa·s$^{0.17}$. With a shear rate of 100 s$^{-1}$, the slurry viscosity is less than 0.45 Pa·s, which provides process capacity for the application to the current collector plate. At shear rates of less than 1 s$^{-1}$, the viscosity is more than 20.4 Pa·s, which ensures the slurry stability during storage before use, and the stability of the slurry layer on the current collector before drying.

The storage stability of the anode slurry was tested by the above method in Example 1. Within a week, the water content in the upper third of the slurry increased from 44.6 wt. % to 45.2 wt. %, i.e., less than 2 rel. % of the initial value. This is indicative of a high slurry stability.

For the anode production, the resultant anode slurry was applied to a copper foil using a doctor blade, dried at a temperature of 100° C. for 1 hour and compacted on a calender with a force of 5 tons to an anode material density of 1.6 g/cm$^3$. The load of the active material on the anode is 5.5 mg/cm$^2$. The anode properties were determined by assembling a cell with a Li cathode and the Li reference electrode, and an electrolyte, which is a 1 M solution of LiPF$_6$ in the mixture of propylene carbonate:ethyl methyl carbonate:dimethyl carbonate solvents with a volume ratio of 1:1:1 and additional 10% v/v of fluoroethylene carbonate. The initial specific capacity of the anode at a charge current of 0.1 A/g of the anode material is 900 mA·h/g of the anode material.

Figure 9:
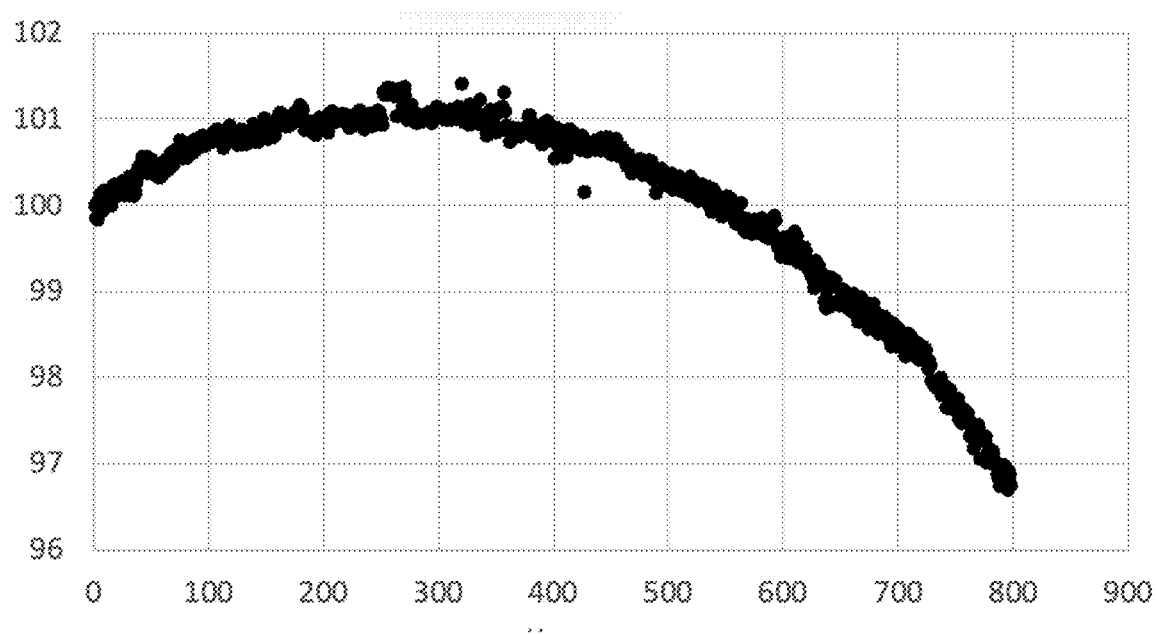
FIG. 9 illustrates capacity related to initial capacity as a function of the number of charge-discharge cycles (charge rate 1C, discharge rate 1C) of the lithium-ion battery with cathode and anode of Example 5.

The lithium-ion battery was assembled from the resultant cathode and anode. A 16 μm thick polypropylene separator was used. A 1.5 M solution of LiPF$_6$ in the mixture of propylene carbonate:ethyl methyl carbonate:dimethyl carbonate solvents in a volume ratio of 1:1:1 with additional 20% v/v of fluoroethylene carbonate was used as an electrolyte. The initial battery capacity at a discharge rate of 0.1 C was 1200 mA·h. The capacity (referred to the initial capacity) as a function of the number of charge-discharge cycles (charge current 1200 mA, discharge current 1200 mA) is shown in FIG. 9. The battery capacity is more than 96% of the initial capacity after 800 cycles.

Example 6

The dispersion contains 2 wt. % of the carboxymethylcellulose Na salt gelling agent and 0.3 wt. % of single-walled carbon nanotubes and agglomerates thereof in water. The single-walled carbon nanotubes used for producing the dispersion are Tuball™-99 SWCNTs. The SWCNT diameter is in the range of 1.2 to 2.1 nm, with a mean diameter of 1.58 nm (the diameter was determined by TEM of the dry suspension matter, and by the positions of the absorption bands $S_{1-1}$ in the optical absorption spectrum of the suspension). Raman spectroscopy at 532 nm shows a strong G line at 1580 cm$^{-1}$ typical for single-walled carbon nanotubes, and a D line at ca. 1330 cm$^{-1}$ typical for other allotropic forms of carbon and defects of single-walled carbon nanotubes. The G/D line intensity ratio is 56. The specific surface area determined from nitrogen adsorption isotherms is 1160 m$^2$/g. The inductively coupled plasma atomic emission spectroscopy (ICP-AES) shows that the SWCNTs contain an impurity of 0.4 wt. % of iron, metal of the Group 8 of the Periodic Table of Elements. The weight ratio of single-walled carbon nanotubes to the HNBR in the slurry is 0.15.

The dispersion was produced by mixing the required proportions of water, carboxymethylcellulose Na salt, and SWCNTs and 6-fold dispersing in a NETZSCH Omega 500 high-pressure homogenizer at a pressure of 65 MPa and a dispersion transfer rate of 300 kg/h through the nozzle with a diameter of 700 μm. The shear rate in the nozzle is about 6·10$^5$ s$^{-1}$. The power consumption was 9 kW, the specific input energy at the stage (D) was about 30 W·h/kg. Between each two dispersion stages, the dispersion was held in a 100 liter tank at rest and agitated slowly by a gate agitator and at a shear rate of about 3 s$^{-1}$ for 20 minutes.

The viscosity was measured at a constant temperature of 25° C. using a Brookfield DV2-TLV viscometer with an SC4-21 spindle. The viscosity as a function of shear rate is well described by the Ostwald-de Waele power law in a range from 0.093 s$^{-1}$ to 100 s$^{-1}$. The flow behavior index n is 0.13, and the flow consistency index is 20.5 Pa·s$^{0.13}$. The dispersion viscosity in the area of low shear rates of less than 1/6.3 s$^{-1}$ is more than 100 Pa·s, and it is less than 1.6 Pa·s in the area of shear rates of more than 18.6 s$^{-1}$.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 2800 Pa, and the loss modulus G"=320 Pa, which means that the dispersion is a highly viscous gel.

The dispersion was used to produce the cathode slurry containing 66.1 wt. % of active material LiNi$_{0.6}$Co$_{0.2}$Mn$_{0.2}$O$_2$ (NCM622), 30.3 wt. % of N-methylpyrrolidone (NMP) solvent, 2.2 wt. % of water, 1.32 wt. % of PVDF binder, 0.046 wt. % of carboxymethylcellulose Na salt gelling agent, and 0.0069 wt. % of single-walled carbon nanotubes. The cathode slurry was produced by the sequence of stages:

adding 110 g of N-methylpyrrolidone and 4.8 g of polyvinylidene fluoride (PVDF) powder to 8.3 g of the dispersion, mixing on an overhead stirrer for 30 minutes (an additional stage to introduce additional solvent (NMP) and binder before the stage (C2));

mixing the resultant mixture with 240 g of the active component NCM622 (stage (C1));

agitating for 16 hours to produce a homogeneous slurry (stage (C2)).

With both the single-walled carbon nanotubes and the gelling agent in the dispersion used to produce the slurry, the resultant cathode slurry has a sharply pronounced dependence of viscosity on shear rate, which is well described by the power law with a flow behavior index 0.28 and a flow consistency index 22 Pa·s$^{0.28}$. With a shear rate of 100 s$^{-1}$, the dynamic viscosity is about 0.80 Pa·s, which provides process capacity for the application to the current collector plate. At shear rates of not more than 1 s$^{-1}$, the viscosity is at least 22 Pa·s, which ensures the slurry stability during storage before use, and the stability of the slurry layer on the current collector before drying.

The slurry storage stability was determined by the method described in Example 1. The solvent (water and NMP)

content in the initial slurry was 32.5 wt. %, after one-week storage, the water content was 32.8 wt. % in the upper third, 32.7 wt. % in the middle part, and 32.1 wt. % in the lower part. The difference from the initial content of the solvents does not exceed 2 rel. %. The slurry can be used to produce the cathode after 7-day storage.

The lithium-ion battery cathode was produced by applying the resultant slurry to an aluminum foil of the current collector, drying the applied slurry until the cathode is formed, and compacting the cathode on a calender with a force of 5 tons to the required density of 3.7 mg/cm². The cathode properties were determined by assembling a cell with a Li cathode and the Li reference electrode, and an electrolyte, which is a 1 M solution of $LiPF_6$ in the mixture of propylene carbonate:ethyl methyl carbonate:dimethyl carbonate solvents with a volume ratio of 1:1:1 and additional 5% v/v of vinyl carbonate. The initial specific capacity of the cathode at a discharge current of 0.017 A/g of the cathode material is 173 mA·h/g of the cathode material.

The dispersion was used to produce the anode slurry containing 39 wt. % of graphite active material, 4.5 wt. % of silicon oxide $SiO_x$ active material, 55.1 wt. % of water solvent, 1.35 wt. % of carboxymethylcellulose Na salt (Na-CMC) gelling agent and binder, and 0.027 wt. % of single-walled carbon nanotubes. The anode slurry was produced by the sequence of stages: mixing 11.7 of the dispersion, 50 g of water, 1.27 g of Na-CMC powder, 43.5 g of graphite powder and 5 g of $SiO_x$ silicon oxide powder (stage (A1) where additional water solvent and Na-CMC binder were introduced), and agitating for 12 hours to produce a homogeneous slurry (stage (A2)).

With both the single-walled carbon nanotubes and the gelling agent present, the resultant anode slurry has a sharply pronounced dependence of viscosity on shear rate, which is described by the power law. The flow behavior index is 0.25, and the flow consistency index is 11.6 Pa·s$^{0.25}$. With a shear rate of 100 s$^{-1}$, the slurry viscosity is less than 0.37 Pa·s, which provides process capacity for the application to the current collector plate. At shear rates of less than 1 s$^{-1}$, the viscosity is more than 11.6 Pa·s, which ensures the slurry stability during storage before use, and the stability of the slurry layer on the current collector before drying.

The storage stability of the anode slurry was tested by the above method in Example 1. Within a week, the water content in the upper third of the slurry increased from 55 wt. % to 55.6 wt. %, i.e., less than 2 rel. % of the initial value. This is indicative of a high slurry stability.

For the anode production, the resultant anode slurry was applied to a copper foil using a doctor blade, dried at a temperature of 100° C. for 1 hour and compacted on a calender with a force of 5 tons to an anode material density of 1.5 g/cm³. The anode properties were determined by assembling a cell with a Li cathode and the Li reference electrode, and an electrolyte, which is a 1 M solution of $LiPF_6$ in the mixture of propylene carbonate:ethyl methyl carbonate:dimethyl carbonate solvents with a volume ratio of 1:1:1 and additional 10% v/v of fluoroethylene carbonate. The initial specific capacity of the anode at a charge current of 0.1 A/g of the anode material is 420 mA·h/g of the anode material.

The lithium-ion battery was assembled from the resultant cathode and anode. A 16 μm thick polypropylene separator was used. A 1.5 M solution of $LiPF_6$ in the mixture of ethylene carbonate:ethyl methyl carbonate:dimethyl carbonate solvents in a volume ratio of 1:1:1 with additional 20% v/v of fluoroethylene carbonate was used as an electrolyte. The initial battery capacity at a discharge rate of 0.1 C was 2400 mA·h. The battery capacity is more than 85% of the initial capacity after 500 charge-discharge cycles (charge current 800 mA, discharge current 800 mA).

Example 7

The dispersion contains 0.8 wt. % of the carboxymethylcellulose Na salt gelling agent and 0.8 wt. % of single-walled carbon nanotubes and agglomerates thereof in water. The dispersion was produced using Tuball™ SWCNTs modified with chlorine, as described in Example 1. The weight ratio of single-walled carbon nanotubes to the gelling agent in the slurry is 1.

The dispersion was produced by mixing the required proportions of water, Na salt of polyacrylic acid, and SWCNTs and 15-fold repeating the alternating stages: dispersing in a rotary pulsation apparatus (RPA) with a power consumption of 32 kW, a rotor diameter of 190 mm, a gap between the rotor and the stator of 700 μm, and a rotor speed of 2940 rpm, ultrasonic treatment in a 100 liter tank at a frequency of 40 kHz and the acoustic input power of the sonotrode 1600 W, and at rest in a 65 liter tank while agitating slowly by an anchor agitator at 30 rpm and a shear rate of about 2 s$^{-1}$. The rate of dispersion circulation between the RPA, the probe sonicator, and the tank was 1200 kg/h; about 25 W·h/kg of energy is applied to the dispersion in the RPA at the dispersion stage (D); about 1.3 W·h/kg is applied to the dispersion at the ultrasonic treatment stage (D); the mean tank residence time of the dispersion at a shear rate of about 1 s$^{-1}$ is about 3.25 minutes at the stage (R).

The dispersion was produced by mixing the required proportions of water, carboxymethylcellulose Na salt, and SWCNTs and 6-fold dispersing in a NETZSCH Omega 500 high-pressure homogenizer at a pressure of 65 MPa and a dispersion transfer rate of 300 kg/h through the nozzle with a diameter of 700 μm. The shear rate in the nozzle is about 6·10$^5$ s$^{-1}$. The power consumption was 9 kW, the specific input energy at the stage (D) was about 30 W·h/kg. Between each two dispersion stages, the dispersion was held in a 100 liter tank at rest and agitated slowly by a gate agitator and at a shear rate of about 3 s$^{-1}$ for 20 minutes.

The viscosity was measured at a constant temperature of 25° C. using a Brookfield DV2-TLV viscometer with an SC4-21 spindle. The viscosity as a function of shear rate is well described by the Ostwald-de Waele power law in a range from 0.093 s$^{-1}$ to 100 s$^{-1}$. The flow behavior index n is 0.26, and the flow consistency index is 12.8 Pa·s$^{0.26}$. The dispersion viscosity in the area of low shear rates of less than 1/6.3 s$^{-1}$ is more than 50 Pa·s, and it is less than 1.5 Pa·s in the area of shear rates of more than 18.6 s$^{-1}$.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 905 Pa, and the loss modulus G"=240 Pa, which means that the dispersion is a highly viscous gel.

The dispersion was used to produce the cathode slurry containing 49.6 wt. % of active cathode material $LiFePO_4$ (LFP), 48.3 wt. % of water solvent, 1 wt. % of acetylene black, 1 wt. % of Na-carboxymethylcellulose gelling agent and binder, and 0.014 wt. % of single-walled carbon nanotubes. The cathode slurry was produced by the sequence of stages:

mixing 1.7 g of the dispersion, 45 g of water, 1 g of Na-carboxymethylcellulose powder, 1 g of acetylene black, and 48 g of active component LFP (stage (C1) where water, an electrically conductive additive, and a binder were further introduced);

agitating for 16 hours to produce a homogeneous slurry (stage C2).

With both the single-walled and double-walled carbon nanotubes and the gelling agent in the dispersion used to produce the slurry, the resultant cathode slurry has a sharply pronounced dependence of viscosity on shear rate, which is well described by the power law. The flow behavior index is 0.27, and the flow consistency index is 14.4 Pa·s$^{0.27}$. The viscosity measured at a shear rate of 93 s$^{-1}$ is 0.51 Pa·s, and the dependence extrapolation to a shear rate of 100 s$^{-1}$ gives a viscosity estimate of about 0.50 Pa·s, which provides process capacity for the application to the current collector plate. At shear rates of not more than 1 s$^{-1}$, the viscosity is at least 14.4 Pa·s, which ensures the slurry stability during storage before use, and the stability of the slurry layer on the current collector before drying.

The storage stability of the cathode slurry was tested by the above method in Example 1. Within a week, the water content in the upper third of the slurry increased from 48.3 wt. % to 49.0 wt. %, i.e., less than 2 rel. % of the initial value. This is indicative of a high slurry stability.

The dispersion was used to produce the anode slurry containing 45.9 wt. % of graphite active material, 53.1 wt. % of water solvent, 0.93 wt. % of Na-carboxymethylcellulose gelling agent, and 0.13 wt. % of single-walled carbon nanotubes. The anode slurry was produced by the sequence of stages: mixing 1.7 g of the dispersion and 55 g of water, 0.98 g of Na-CMC powder and 49 g of graphite powder (stage A1), and agitating the resultant mixture for 12 hours to produce a homogeneous slurry (stage A2).

With both the single-walled and double-walled carbon nanotubes and the gelling agent in the dispersion used to produce the slurry, the resultant anode slurry has a sharply pronounced dependence of viscosity on shear rate, which is well described by the power law. The flow behavior index is 0.22, and the flow consistency index is 12.8 Pa·s$^{0.22}$. The viscosity measured at a shear rate of 93 s$^{-1}$ is 0.37 Pa·s, and the dependence extrapolation to a shear rate of 100 s$^{-1}$ gives a viscosity estimate of about 0.35 Pa·s, which provides process capacity for the application to the current collector plate. At shear rates of not more than 1 s$^{-1}$, the viscosity is at least 12.8 Pa·s, which ensures the slurry stability during storage before use, and the stability of the slurry layer on the current collector before drying.

The storage stability of the anode slurry was tested by the above method in Example 1. Within a week, the water content in the upper third of the slurry increased from 53.6 wt. % to 54.7 wt. %, i.e., less than 2 rel. % of the initial value. This is indicative of a high slurry stability.

For the anode production, the resultant anode slurry was applied to a copper foil using a doctor blade, dried at a temperature of 100° C. for 1 hour and compacted on a calender with a force of 5 tons to an anode material density of 1.7 g/cm$^3$. The anode properties were determined by assembling a cell with a Li cathode and the Li reference electrode, and an electrolyte, which is a 1 M solution of LiPF$_6$ in the mixture of ethylene carbonate:ethyl methyl carbonate:dimethyl carbonate solvents with a volume ratio of 1:1:1 and additional 10% v/v of fluoroethylene carbonate.

The initial specific capacity of the anode at a charge current of 0.1 A/g of the anode material is 330 mA·h/g of the anode material.

The lithium-ion battery was assembled from the resultant cathode and anode. A 16 µm thick polypropylene separator was used. A 1.5 M solution of LiPF$_6$ in the mixture of ethylene carbonate:ethyl methyl carbonate:dimethyl carbonate solvents in a volume ratio of 1:1:1 with additional 20% v/v of fluoroethylene carbonate was used as an electrolyte. The initial battery capacity at a discharge rate of 0.1 C was 1250 mA·h. The battery capacity is 1130 mA h, i.e., more than 90% of the initial capacity, after 1000 cycles.

Example 8 (Comparative)

The dispersion contains 0.4 wt. % of the SWCNTs described in Example 1, and water. The dispersion contains no gelling agent. The dispersion was produced similarly to Example 1.

The dispersion viscosity was measured at a constant temperature of 25° C. using a Brookfield DV2-TLV viscometer with an SC4-21 spindle. The viscosity as a function of shear rate is described by the Ostwald-de Waele power law in a range from 0.093 s$^{-1}$ to 100 s$^{-1}$. The flow behavior index n is 0.62, and the flow consistency index is 3.0 Pa·s$^{0.62}$. The dispersion viscosity in the area of low shear rates of less than 1/6.3 s$^{-1}$ is about 6 Pa·s, and it is about 1 Pa·s in the area of shear rates of more than 18.6 s$^{-1}$. The dispersion viscosity in the area of low shear rates is less than 20 Pa·s and is not enough to ensure dispersion stability during long-term storage.

The rheological properties of the dispersion were measured with a HAAKE RheoStress 6000 dynamic shear rheometer in a plate-to-plate cell with a gap of 0.5 mm. The dispersion sample was transferred to the lower plate (d=20 mm) with a spatula, thermostatted at (T=19-21° C.), then the plates were closed to a gap of 0.55 mm, after which the excess sample was removed with a metal spatula, and the plates were closed again to a measurement gap of 0.5 mm. For a deformation amplitude of 1% corresponding to a rotation angle of the moving plate of 0.029°, the storage modulus G' is 103 Pa, the loss modulus G"=19 Pa, which is also indicative of a fairly low viscosity of the resultant gel.

The dispersion was used to produce the cathode slurry with its composition and production sequence similar to Example 1, except that there was no gelling agent in the dispersion. Therefore, the corresponding amount of gelling agent was added in the form of Na-carboxymethylcellulose solution:

adding 54 g of the solution containing 1 g of Na-carboxymethylcellulose and 53 g of water to 12.5 g of the dispersion produced, mixing on an overhead stirrer for 30 minutes;

mixing the resultant mixture with 97.75 g of the active component LiFePO$_4$;

adding 2.4 g of aqueous styrene butadiene rubber latex with a dry matter content of 50%;

agitating for 16 hours to produce a homogeneous slurry.

The viscosity of the resultant cathode slurry as a function of shear rate is illustrated by dark squares (curve 8C) in FIG. 3. This dependence is described by the Ostwald-de Waele power law with a flow behavior index n=0.46 and a flow consistency index 9.3 Pa·s$^{0.46}$. The slurry viscosity is about 9.3 Pa·s at shear rates of about 1 s$^{-1}$. This viscosity, as shown by the slurry storage stability studies and cathode application experiments, is not enough to achieve the necessary technical result, which is no delamination of the cathode slurry during storage and high quality of the cathode obtained by applying the slurry to the current collector.

The storage stability of the slurry was determined by the changing distribution of the solid particle content along the height of the slurry layer after the slurry storage in a 50 ml cylindrical test tube with a diameter of 30 mm. For this purpose, the slurry was put in the test tube, closed with a lid, and kept for 7 days under standard conditions (atmospheric pressure, 25° C.) and analyzed similarly to the procedure described in Example 1. A turbid supernatant layer of about 6 mm thickness was formed on the slurry surface in 7 days. For the cathode slurry of this Example, the solvent content in the initial slurry was 40 wt. %, after one-week storage, the solvent content was 54.1 wt. % in the upper third, 36.5 wt. % in the middle part, and 29.6 wt. % in the lower part. There was significant delamination of the cathode slurry preventing its application after 7 days.

It is impossible to obtain a high-quality coating of the current collector with the cathode slurry when trying to produce a cathode with the resultant cathode slurry—see FIG. 4 (photo on the right). The resultant dispersion without a gelling agent, and the cathode slurry produced with the use of this dispersion do not allow the necessary technical result.

The dispersion was used to produce the anode slurry with its composition and production sequence similar to Example 1, except that there was no gelling agent in the dispersion. Therefore, the corresponding amount of gelling agent was added in the form of Na-carboxymethylcellulose solution. The anode slurry was produced by the sequence of stages:

mixing 187.5 g of the dispersion, 1388 g of water, 112 g of 1 wt. % of Na-CMC aqueous solution, 1000 g of graphite powder, and 454.2 g of silicon powder, agitating for 10 hours;

adding 54 g of 50 wt. % of aqueous butadiene styrene latex suspension;

agitating for 2 hours to produce a homogeneous slurry.

The slurry storage stability was determined by a procedure similar to that described in Example 1. A turbid supernatant layer of about 8 mm thickness was formed on the slurry surface in 7 days. For the anode slurry of this Example, the solvent content in the initial slurry was 53.6 wt. %, after one-week storage, the solvent content was 68.1 wt. % in the upper third, 48.0 wt. % in the middle part, and 44.2 wt. % in the lower part. There was significant delamination of the cathode slurry preventing its application after 7 days.

Table 1 below shows a summary of compositions and properties of dispersions of Examples 1-8.

Table 2 below shows a summary of compositions and properties of cathode and anode slurries of Examples 1-8.

TABLE 1

| Example number | CNT content wt. % | Gelling agent (GA) content wt. % | CNT/GA weight ratio | G/D | Content of mod. groups and metals wt. % | K Pa·s$^n$ | n | Viscosity at (1/6.3) s$^{-1}$ Pa·s | Viscosity at 18.6 s$^{-1}$ Pa·s | G' at 1 Hz Pa | G" at 1 Hz Pa |
|---|---|---|---|---|---|---|---|---|---|---|---|
| 1 | SWCNT 0.4 | Na-CMC 0.6 | 0.67 | 80 | Cl: 0.24 Fe: 0.46 | 9.0 | 0.14 | 43 | 0.72 | 912 | 190 |
| 2 | SWCNT 0.3 | PVP 0.6 | 0.5 | 24 | COOH: 0.62 Fe: 0.006 | 21.6 | 0.16 | 102 | 1.9 | 2460 | 390 |
| 3 | SWCNT 0.3 | Na-PAA 2 | 0.15 | 46 | Fe: 14.2 | 19.0 | 0.23 | 79 | 0.52 | 1150 | 410 |
| 4 | SWCNT and DWCNT 0.4 | Na-CMC 0.6 | 0.67 | 34 | None | 4.9 | 0.19 | 22 | 0.46 | 176 | 28 |
| 5 | SWCNT 2 | Li-CMC 0.2 | 10 | 80 | Cl: 0.24 Fe: 0.46 | 13.5 | 0.33 | 46 | 1.9 | 980 | 460 |
| 6 | SWCNT 0.3 | Na-CMC 2 | 0.15 | 56 | Fe: 0.4 | 20.5 | 0.13 | 102 | 1.6 | 2800 | 320 |
| 7 | SWCNT 0.8 | Na-CMC 0.8 | 1 | 80 | Cl: 0.24 Fe: 0.46 | 12.8 | 0.26 | 50 | 1.47 | 905 | 240 |
| 8 (comp.) | SWCNT 0.4 | 0 | — | 80 | Cl: 0.24 Fe: 0.46 | 3 | 0.62 | 6.0 | 1.0 | 103 | 19 |

TABLE 2

| Ex. No. | Cathode slurry Content, wt. % | Stability | K, Pa·s$^n$ | n | Anode slurry Content, wt. % | Stability | K, Pa·s$^n$ | n | Battery capacity, % of initial one (after N cycles) |
|---|---|---|---|---|---|---|---|---|---|
| 1 | 58.7 LFP, 40.0 water, 0.72 SBR, 0.6 Na-CMC and 0.03 SWCNT | + | 21 | 0.26 | 31.3 graphite, 14.2 Si, 53.6 water, 0.35 Na-CMC 0.84 SBR, and 0.18 SWCNT | + | 11.6 | 0.17 | 90 (3000 cycles at 1 C) |
| 2 | 61 NCM111, 37.7 water, 0.62 SBR, 0.62 Na-CMC, 0.047 PVP and 0.023 SWCNT | + | 18.8 | 0.24 | 26.6 graphite, 16.2 Si, 55.5 water, 0.33 PVP, 0.49 Na-CMC, 0.66 SBR and 0.17 SWCNT | + | 12.3 | 0.19 | 96 (1000 cycles at 1 C) |
| 3 | 29.9 LCO, 68.6 water, 1.25 Na-PAA and 0.19 SWCNT | + | 12.1 | 0.20 | 18.5 SiO$_x$, 79.7 water, 1.63 Na-PAA and 0.24 SWCNT | + | 10.5 | 0.17 | 86 (215 cycles at 1 C) |
| 4 | 58.7 LFP, 40.0 water, 0.72 SBR, 0.6 Na-CMC and 0.03 D&SWCNT | + | 18.0 | 0.29 | 31.3 graphite, 14.2 Si, 53.6 water, 0.84 SBR, 0.35 Na-CMC and 0.18 D&SWCNT | + | 11.0 | 0.20 | 92 (400 cycles at 1 C) |

TABLE 2-continued

| Ex. No. | Cathode slurry Content, wt. % | Stability | K, Pa·s$^n$ | n | Anode slurry Content, wt. % | Stability | K, Pa·s$^n$ | n | Battery capacity, % of initial one (after N cycles) |
|---|---|---|---|---|---|---|---|---|---|
| 5 | 55.1 LFP, 42.3 water, 0.57 SBR, 1.22 Na-CMC and 0.85 SWCNT | + | 19.9 | 0.18 | 18 graphite, 32.9 SiO$_x$, 44.6 water, 3.1 Li-CMC, 0.6 SBR and 0.9 SWCNT | + | 20.4 | 0.17 | 96 (800 cycles at 1 C) |
| 6 | 66.1 NCM622, 2.2 water, 30.3 NMP, 0.046 Na-CMC 1.32 PVDF and 0.0069 SWCNT | + | 22 | 0.28 | 39 graphite, 4.5 SiO$_x$, 55.1 water, 1.35 Na-CMC, and 0.027 SWCNT | + | 11.6 | 0.25 | 85 (500 cycles at 0.33 C) |
| 7 | 49.6 LFP, 48.3 water, 1.0 carbon black, 1.0 Na-CMC and 0.014 SWCNT | + | 14.4 | 0.27 | 45.9 graphite, 53.1 water, 0.93 Na-CMC and 0.13 SWCNT | + | 12.8 | 0.22 | 90 (1000 cycles at 0.5 C) |
| 8 (comp.) | 58.7 LiFePO$_4$, 40.0 water, 0.72 SBR, 0.6 Na-CMC and 0.03 SWCNT | − | 9.3 | 0.46 | 31.3 graphite, 14.2 Si, 53.6 water, 0.35 Na-CMC, 0.84 SBR and 0.18 SWCNT | − | 6.9 | 0.41 | low grade electrodes |

INDUSTRIAL APPLICABILITY

The present invention, in one embodiment, is used to produce dispersions of single-walled and/or double-walled carbon nanotubes and agglomerates thereof in a liquid phase, electrode slurries, lithium-ion battery electrodes, and lithium-ion batteries.

It should also be appreciated that various modifications, adaptations, and alternative embodiments thereof may be made within the scope and spirit of the present invention. The invention is further defined by the following claims.

What is claimed is:

1. A dispersion, comprising:
water;
a gelling agent; and
single-walled carbon nanotubes,
wherein the single-walled carbon nanotubes are between 0.3 to 2 wt. % of the dispersion,
wherein a weight ratio of the single-walled carbon nanotubes to the gelling agent is at least 0.05 and not more than 10, and
wherein the dispersion is a weak gel that includes the single-walled carbon nanotubes that are physically bound with gel particles formed by agglomerates of molecules of the gelling agent.

2. The dispersion of claim 1, wherein the dispersion is a pseudoplastic power-law fluid with a flow behavior index n not more than 0.37 and a flow consistency index K of at least 3.2 Pa·s$^n$.

3. The dispersion of claim 1, wherein the dispersion has a loss modulus of at least 27 Pa when an oscillating shear strain at a frequency of 1 Hz and a relative shear strain amplitude of 1% is applied.

4. The dispersion of claim 1, wherein the gelling agent is any of carboxymethylcellulose or its salt, polyvinylpyrrolidone, polyacrylic acid or its salt, or a mixture thereof.

5. The dispersion of claim 1, wherein the single-walled carbon nanotubes contain at least 0.1 wt. % of functional groups on their surfaces.

6. The dispersion of claim 5, wherein the single-walled carbon nanotubes contain at least 0.1 wt. % of chlorine and/or at least 0.1 wt. % of carbonyl and/or hydroxyl, and/or carboxyl groups on their surfaces.

7. The dispersion of claim 1, wherein a ratio of the G/D line intensities in a Raman spectrum of the single-walled carbon nanotubes at a wavelength of 532 nm is at least 10.

8. The dispersion of claim 1, wherein the single-walled carbon nanotubes and/or agglomerates thereof contain Group 8-11 metal impurities.

9. The dispersion of claim 8, wherein a content of Group 8-11 metal impurities in single-walled carbon nanotubes and/or agglomerates thereof is less than 1 wt. %.

10. The dispersion of claim 1, wherein a flow behavior index n and a flow consistency index K of the dispersion meet a condition n<1.25·lg (K/(Pa·s$^n$))−0.628 or n<1.24−0.787·lg (K/(Pa·s$^n$)).

11. A dispersion, comprising:
water;
a gelling agent; and
single-walled and/or double-walled carbon nanotubes, each of the carbon nanotubes having a diameter of up to 4 nm,
wherein the carbon nanotubes are between 0.3 to 2 wt. % of the dispersion,
wherein a weight ratio of the carbon nanotubes to the gelling agent is between 0.05 and 10, and
wherein the dispersion is a pseudoplastic weak gel.

12. The dispersion of claim 11, wherein the carbon nanotubes are physically bound with gel particles formed by agglomerates of molecules of the gelling agent.

13. The dispersion of claim 11, wherein the agglomerates contain Group 8-11 metal impurities.

14. The dispersion of claim 11, wherein the carbon nanotubes have a Raman G/D ratio of at least 40 at 532 nm.

15. The dispersion of claim 11, wherein the pseudoplastic weak gel is a power law fluid with a flow behavior index n of less than 0.37.

16. The dispersion of claim 11, wherein the pseudoplastic weak gel is a power law fluid with a flow consistency index K of not less than 3.2 Pa·s$^n$.

17. The dispersion of claim 11, wherein the gelling agent is any of carboxymethylcellulose or its salt, polyvinylpyrrolidone, polyacrylic acid or its salt, or a mixture thereof.

* * * * *